US012775069B2

(12) United States Patent
Suzuki

(10) Patent No.: US 12,775,069 B2
(45) Date of Patent: Oct. 27, 2026

(54) MISALIGNMENT CALCULATION APPARATUS

(71) Applicant: DENSO CORPORATION, Kariya-city (JP)

(72) Inventor: Yasuhiro Suzuki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 386 days.

(21) Appl. No.: 18/518,244

(22) Filed: Nov. 22, 2023

(65) Prior Publication Data

US 2024/0094341 A1 Mar. 21, 2024

Related U.S. Application Data

(63) Continuation of application No. PCT/JP2022/021413, filed on May 25, 2022.

(30) Foreign Application Priority Data

May 28, 2021 (JP) ................................ 2021-090345

(51) Int. Cl.

*G01S 7/40* (2006.01)
*G01S 7/497* (2006.01)
*G01S 13/931* (2020.01)

(52) U.S. Cl.

CPC .......... *G01S 7/4008* (2013.01); *G01S 7/4021* (2013.01); *G01S 13/931* (2013.01); *G01S 7/497* (2013.01); *G01S 2013/9329* (2020.01)

(58) Field of Classification Search

CPC .... G01S 7/4008; G01S 7/4021; G01S 13/931; G01S 2013/9329

See application file for complete search history.

(56) References Cited

U.S. PATENT DOCUMENTS 11,243,292 B2 * 2/2022 Tietze .................... G01S 7/4026
12,099,139 B2 * 9/2024 Kondo .................. G01S 7/4026

(Continued)

FOREIGN PATENT DOCUMENTS

DE 102014223461 A1 * 5/2016 ........... G01S 13/931
JP 2007298409 A * 11/2007

(Continued)

OTHER PUBLICATIONS

Kellner et al., "Joint Radar Alignment and Odometry Calibration," 2015, https://c4i.gmu.edu/~pcosta/F15/data/fileserver/file/472276/filename/Paper_1570109605.pdf (Year: 2015).*

(Continued)

*Primary Examiner* — Timothy A Brainard
*Assistant Examiner* — Noah Yi Min Zhu
(74) *Attorney, Agent, or Firm* — Precision Patents, P.C.

(57) ABSTRACT

In a misalignment calculation apparatus, a reflector information retrieving unit retrieves, based on a measurement result of a radar device installed in an own vehicle, a positional information item on a reflector of each of preceding vehicles that is traveling in front of the own vehicle relative, the positional information on the reflector representing a position of the reflector. A misalignment-quantity calculator calculates a misalignment quantity of the radar device using maximum likelihood estimation in accordance with:

a likelihood model that includes a predetermined correlation representing a reflector existence likelihood at each specified position relative to the radar device; and the retrieved positional information item on the reflector of each of the preceding vehicles relative to the radar device.

9 Claims, 15 Drawing Sheets

(56) References Cited

U.S. PATENT DOCUMENTS

| | | | | |
|---|---|---|---|---|
| 2004/0065814 | A1* | 4/2004 | Miyazaki | G01S 17/42 250/222.1 |
| 2004/0117090 | A1* | 6/2004 | Samukawa | G01S 7/4026 701/45 |
| 2008/0012752 | A1* | 1/2008 | Okamura | G01S 13/931 342/165 |
| 2008/0088481 | A1* | 4/2008 | Kumon | B60Q 1/1423 340/937 |
| 2016/0054439 | A1* | 2/2016 | Brookner | G01S 13/91 342/36 |
| 2016/0116573 | A1* | 4/2016 | Appia | G01S 13/867 342/52 |
| 2016/0223649 | A1* | 8/2016 | Schwindt | G01S 7/4026 |
| 2018/0024228 | A1* | 1/2018 | Schiffmann | G01S 13/86 342/174 |
| 2018/0118201 | A1* | 5/2018 | Matsunaga | B60T 7/12 |
| 2018/0374352 | A1* | 12/2018 | Matsunaga | B60W 30/09 |
| 2022/0365193 | A1* | 11/2022 | Wetoschkin | G01S 13/931 |

FOREIGN PATENT DOCUMENTS

| | | | |
|---|---|---|---|
| JP | 4890928 | B2 | 3/2012 |
| JP | 2019152575 | A * | 9/2019 |

OTHER PUBLICATIONS

Xia et al., "Extended Object Tracking with Automotive Radar Using Learned Structural Measurement Model," 2020 IEEE Radar Conference (RadarConf20), Florence, Italy, 2020, pp. 1-6, doi: 10.1109/RadarConf2043947.2020.9266598. (Year: 2020).*

A. L. Swindlehurst and P. Stoica, "Maximum likelihood methods in radar array signal processing," in Proceedings of the IEEE, vol. 86, No. 2, pp. 421-441, Feb. 1998, doi: 10.1109/5.659495. (Year: 1998).*

W. Kederer and J. Detlefsen, "Sensor-based Determination of Angular Misalignment and Lane Configuration of a Radar Sensor for ACC-Applications," 2000 30th European Microwave Conference, Paris, France, 2000, pp. 1-4, doi: 10.1109/EUMA.2000.338835. (Year: 2000).*

K.-r. Choi, G.-h. Seo, J.-e. Lee, S.-h. Jeong and J.-n. Oh, "Automatic radar horizontal alignment scheme using stationary target on public road," 2013 European Microwave Conference, Nuremberg, Germany, 2013, pp. 1863-1866, doi: 10.23919/EuMC.2013.6687044. (Year: 2013).*

N. Petrov, O. Krasnov and A. Yarovoy, "Statistical Approach for Automotive Radar Self-Diagnostics," 2019 16th European Radar Conference (EuRAD), Paris, France, 2019, pp. 117-120. (Year: 2019).*

* cited by examiner

FIG.12

LM

R11 R12 R13

DISTANCE [m]

| ANGLE [°] | 5 | 10 | 15 | 20 | 25 | 30 | 35 | 40 | 45 | 50 | 55 | 60 | 65 | 70 | 75 | 80 | 85 | 90 | 95 | 100 | 105 |
|---|---|---|---|---|---|---|---|---|---|---|---|---|---|---|---|---|---|---|---|---|---|
| 3.7 | 4 | 5 | 4 | 0 | 0 | 0 | 0 | 0 | 0 | 0 | 0 | 0 | 0 | 0 | 0 | 0 | 0 | 0 | 0 | 0 | 0 |
| 3.5 | 5 | 7 | 4 | 1 | 0 | 0 | 0 | 0 | 0 | 0 | 0 | 0 | 0 | 0 | 0 | 0 | 0 | 0 | 0 | 0 | 0 |
| 3.3 | 5 | 6 | 4 | 2 | 0 | 0 | 0 | 0 | 0 | 0 | 0 | 0 | 0 | 0 | 0 | 0 | 0 | 0 | 0 | 0 | 0 |
| 3.1 | 4 | 8 | 4 | 3 | 0 | 0 | 0 | 0 | 0 | 0 | 0 | 0 | 0 | 0 | 0 | 0 | 0 | 0 | 0 | 0 | 0 |
| 2.9 | 5 | 10 | 4 | 4 | 0 | 0 | 0 | 0 | 0 | 0 | 0 | 0 | 0 | 0 | 0 | 0 | 0 | 0 | 0 | 0 | 0 |
| 2.7 | 5 | 10 | 4 | 6 | 2 | 0 | 0 | 0 | 0 | 0 | 0 | 0 | 0 | 0 | 0 | 0 | 0 | 0 | 0 | 0 | 0 |
| 2.5 | 4 | 9 | 6 | 6 | 4 | 0 | 0 | 0 | 0 | 0 | 0 | 0 | 0 | 0 | 0 | 0 | 0 | 0 | 0 | 0 | 0 |
| 2.3 | 5 | 10 | 8 | 5 | 5 | 2 | 0 | 0 | 0 | 0 | 0 | 0 | 0 | 0 | 0 | 0 | 0 | 0 | 0 | 0 | 0 |
| 2.1 | 4 | 10 | 9 | 6 | 6 | 4 | 1 | 0 | 0 | 0 | 0 | 0 | 0 | 0 | 0 | 0 | 0 | 0 | 0 | 0 | 0 |
| 1.9 | 2 | 7 | 11 | 7 | 6 | 5 | 3 | 0 | 0 | 0 | 0 | 0 | 0 | 0 | 0 | 0 | 0 | 0 | 0 | 0 | 0 |
| 1.7 | 5 | 9 | 12 | 12 | 7 | 7 | 5 | 3 | 0 | 0 | 0 | 0 | 0 | 0 | 0 | 0 | 0 | 0 | 0 | 0 | 0 |
| 1.5 | 4 | 10 | 12 | 14 | 11 | 8 | 7 | 5 | 3 | 1 | 0 | 0 | 0 | 0 | 0 | 0 | 0 | 0 | 0 | 0 | 0 |
| 1.3 | 2 | 7 | 12 | 14 | 13 | 10 | 8 | 7 | 5 | 4 | 2 | 0 | 0 | 0 | 0 | 0 | 0 | 0 | 0 | 0 | 0 |
| 1.1 | 5 | 9 | 15 | 19 | 16 | 17 | 14 | 9 | 9 | 7 | 5 | 5 | 3 | 1 | 0 | 0 | 0 | 0 | 0 | 0 | 0 |
| 0.9 | 4 | 10 | 15 | 18 | 21 | 21 | 18 | 17 | 15 | 9 | 9 | 8 | 6 | 5 | 5 | 4 | 2 | 1 | 0 | 0 | 0 |
| 0.7 | 5 | 10 | 15 | 20 | 24 | 24 | 24 | 24 | 23 | 21 | 18 | 15 | 13 | 10 | 9 | 8 | 7 | 6 | 5 | 5 | 4 |
| 0.5 | 5 | 9 | 15 | 20 | 22 | 27 | 27 | 30 | 29 | 28 | 29 | 26 | 27 | 24 | 21 | 21 | 19 | 19 | 16 | 13 | 13 |
| 0.3 | 4 | 10 | 15 | 17 | 23 | 30 | 33 | 32 | 34 | 36 | 39 | 37 | 37 | 38 | 38 | 35 | 36 | 36 | 36 | 33 | 33 |
| 0.1 | 5 | 10 | 15 | 20 | 25 | 28 | 33 | 37 | 39 | 41 | 43 | 45 | 47 | 49 | 49 | 50 | 50 | 50 | 51 | 51 | 51 |
| -0.1 | 5 | 7 | 13 | 16 | 21 | 23 | 28 | 31 | 35 | 37 | 38 | 40 | 41 | 42 | 44 | 45 | 47 | 47 | 47 | 48 | 48 |
| -0.3 | 4 | 8 | 10 | 13 | 15 | 17 | 20 | 24 | 26 | 29 | 31 | 33 | 34 | 35 | 37 | 38 | 39 | 40 | 40 | 41 | 42 |
| -0.5 | 4 | 5 | 7 | 9 | 10 | 12 | 14 | 16 | 18 | 18 | 20 | 22 | 24 | 25 | 27 | 29 | 31 | 31 | 32 | 33 | 33 |
| -0.7 | 3 | 3 | 5 | 5 | 7 | 7 | 8 | 9 | 9 | 10 | 10 | 13 | 13 | 14 | 14 | 15 | 16 | 16 | 18 | 18 | 20 |
| -0.9 | 3 | 2 | 2 | 2 | 2 | 2 | 2 | 2 | 2 | 2 | 2 | 4 | 4 | 4 | 4 | 4 | 4 | 4 | 4 | 4 | 4 |
| -1.1 | 3 | 1 | 0 | 0 | 0 | 0 | 0 | 0 | 0 | 0 | 0 | 0 | 0 | 0 | 0 | 0 | 0 | 0 | 0 | 0 | 0 |
| -1.3 | 1 | 0 | 0 | 0 | 0 | 0 | 0 | 0 | 0 | 0 | 0 | 0 | 0 | 0 | 0 | 0 | 0 | 0 | 0 | 0 | 0 |
| -1.5 | 1 | 0 | 0 | 0 | 0 | 0 | 0 | 0 | 0 | 0 | 0 | 0 | 0 | 0 | 0 | 0 | 0 | 0 | 0 | 0 | 0 |
| -1.7 | 0 | 0 | 0 | 0 | 0 | 0 | 0 | 0 | 0 | 0 | 0 | 0 | 0 | 0 | 0 | 0 | 0 | 0 | 0 | 0 | 0 |

MISALIGNMENT CALCULATION APPARATUS

CROSS-REFERENCE TO RELATED APPLICATION

The present application is a bypass continuation application of a currently pending international application No. PCT/JP2022/021413 designating the United States of America, the entire disclosure of which is incorporated herein by reference, the internal application being based on and claiming the benefit of priority of Japanese Patent Application No. 2021-090345 filed on May 28, 2021. The disclosure of each of the internal application and the Japanese Patent Application No. 2021-090345 is incorporated in its entirety herein by reference.

TECHNICAL FIELD

The present invention relates to apparatuses for calculating a misalignment quantity of a radar device.

BACKGROUND

Japanese Patent Publication No. 4890928 discloses a radar device that performs a horizontal main scan of a radar beam with a predetermined vertical angle, which will be referred to as a main scan angle, and receives reflected beams from one or more objects. Then, the radar device calculates a deviation angle between the main scan angle and a vertical angle of a maximum beam reflection portion, the reflected beam from which has the maximum intensity. The radar device corrects, based on the deviation angle, the main scan angle.

SUMMARY

Improvement of adaptive-cruise control function requires, for radar devices, to measure farther vehicles relative to the radar devices. This requires higher-accuracy calculation of a misalignment quantity of such a radar device installed in a vehicle.

Inventor's detailed consideration has found out that the following issue arising from the above patent publication:

Specifically, the maximum beam reflection portion of a target vehicle that the radar device disclosed in the above patent publication tracks is usually a reflector of the target vehicle.

The above method disclosed in the patent publication, which calculates a misalignment quantity of the radar device based on a deviation angle between the main scan angle and a vertical angle of the reflector of the target vehicle, may result in a reduction in the calculation accuracy of the misalignment quantity of the target vehicle due to variations in height of the reflectors of vehicles, one of which is employed as the target vehicle.

In view of such an issue, the present disclosure seeks to improve the calculation accuracy of misalignment of a radar device.

A misalignment calculation apparatus according to a first exemplary aspect of the present disclosure includes a reflector information retrieving unit configured to retrieve, based on a measurement result of a radar device installed in an own vehicle, a positional information item on a reflector of each of preceding vehicles that is traveling in front of the own vehicle relative. The positional information on the reflector represents a position of the reflector. The misalignment calculation includes a misalignment-quantity calculator configured to calculate a misalignment quantity of the radar device using maximum likelihood estimation in accordance with (I) A likelihood model that includes a predetermined correlation representing a reflector existence likelihood at each specified position relative to the radar device (II) The retrieved positional information item on the reflector of each of the preceding vehicles relative to the radar device A processor-readable non-transitory storage medium according to a second exemplary aspect of the present disclosure includes a set of program instructions that causes at least one processor to retrieve, based on a measurement result of a radar device installed in an own vehicle, a positional information item on a reflector of each of preceding vehicles that is traveling in front of the own vehicle relative. The positional information on the reflector represents a position of the reflector. The set of the program instructions causes the at least one processor to calculate a misalignment quantity of the radar device using maximum likelihood estimation in accordance with (I) A likelihood model that includes a predetermined correlation representing a reflector existence likelihood at each specified position relative to the radar device (II) The retrieved positional information item on the reflector of each of the preceding vehicles relative to the radar device A method, executable by a processor, according to a third exemplary aspect of the present disclosure includes retrieving, based on a measurement result of a radar device installed in an own vehicle, a positional information item on a reflector of each of preceding vehicles that is traveling in front of the own vehicle relative. The positional information on the reflector represents a position of the reflector.

The method includes calculating a misalignment quantity of the radar device using maximum likelihood estimation in accordance with (I) A likelihood model that includes a predetermined correlation representing a reflector existence likelihood at each specified position relative to the radar device (II) The retrieved positional information item on the reflector of each of the preceding vehicles relative to the radar device Each of the misalignment calculation apparatus, processor-readable non-transitory storage medium, and method uses the likelihood model to calculate the misalignment quantity of the radar device in view of variations in mount height of preceding-vehicle's reflectors, making it possible to improve the calculation accuracy of the misalignment quantity of the radar device.

Figure 3A:
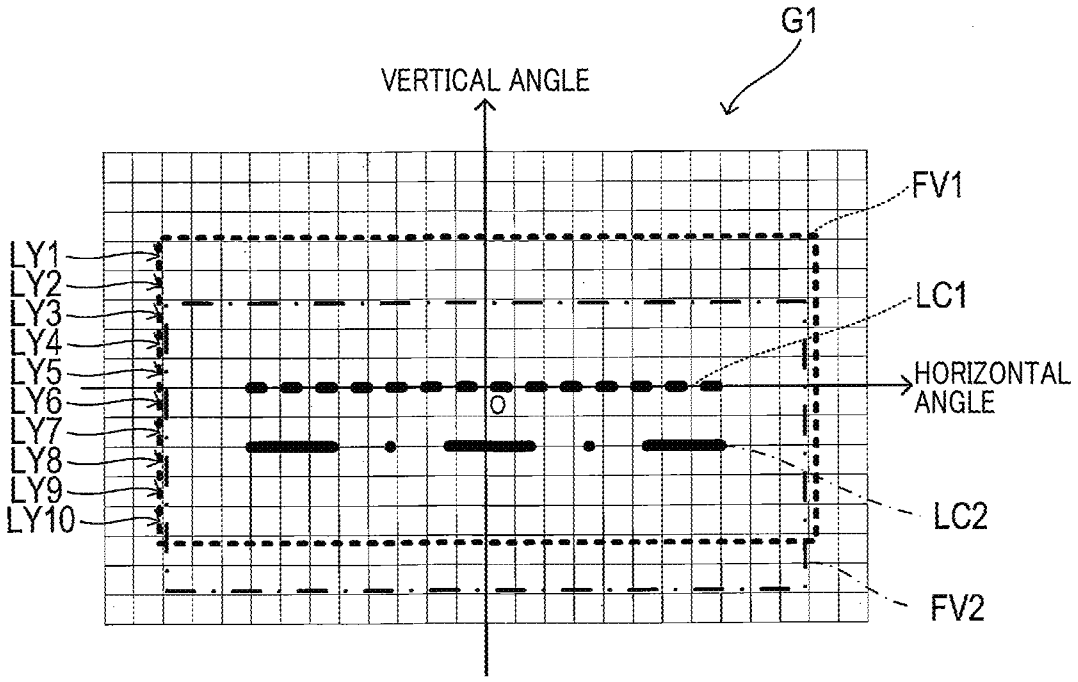
Figure 3B:
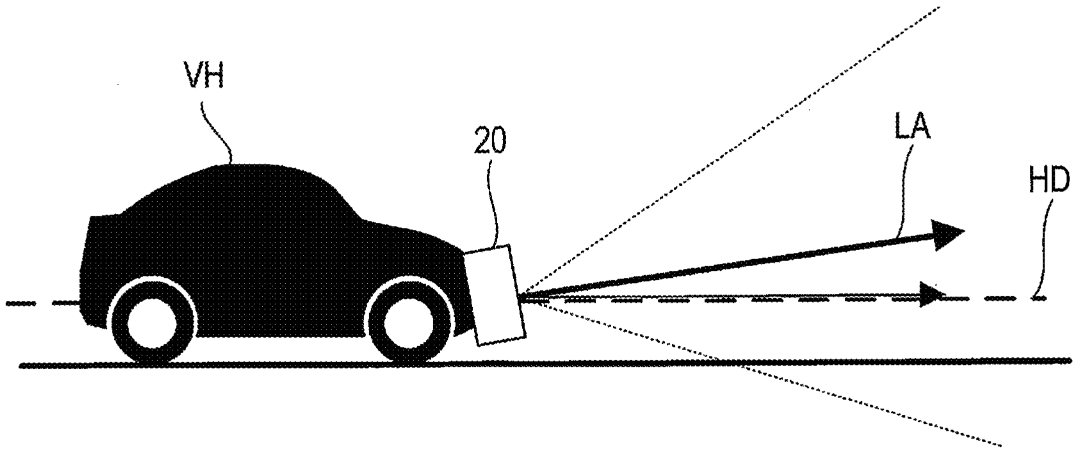
Figure 4:
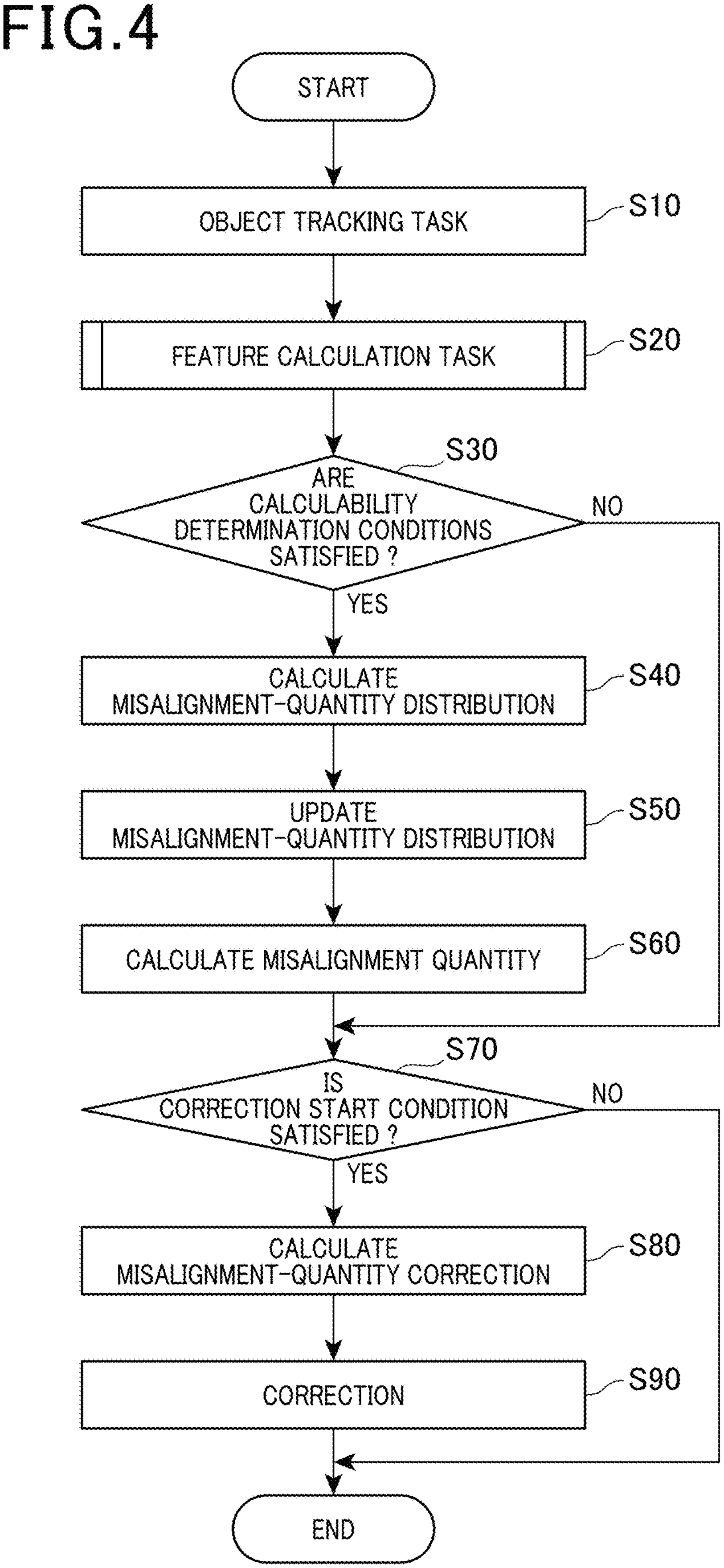
Figure 5:
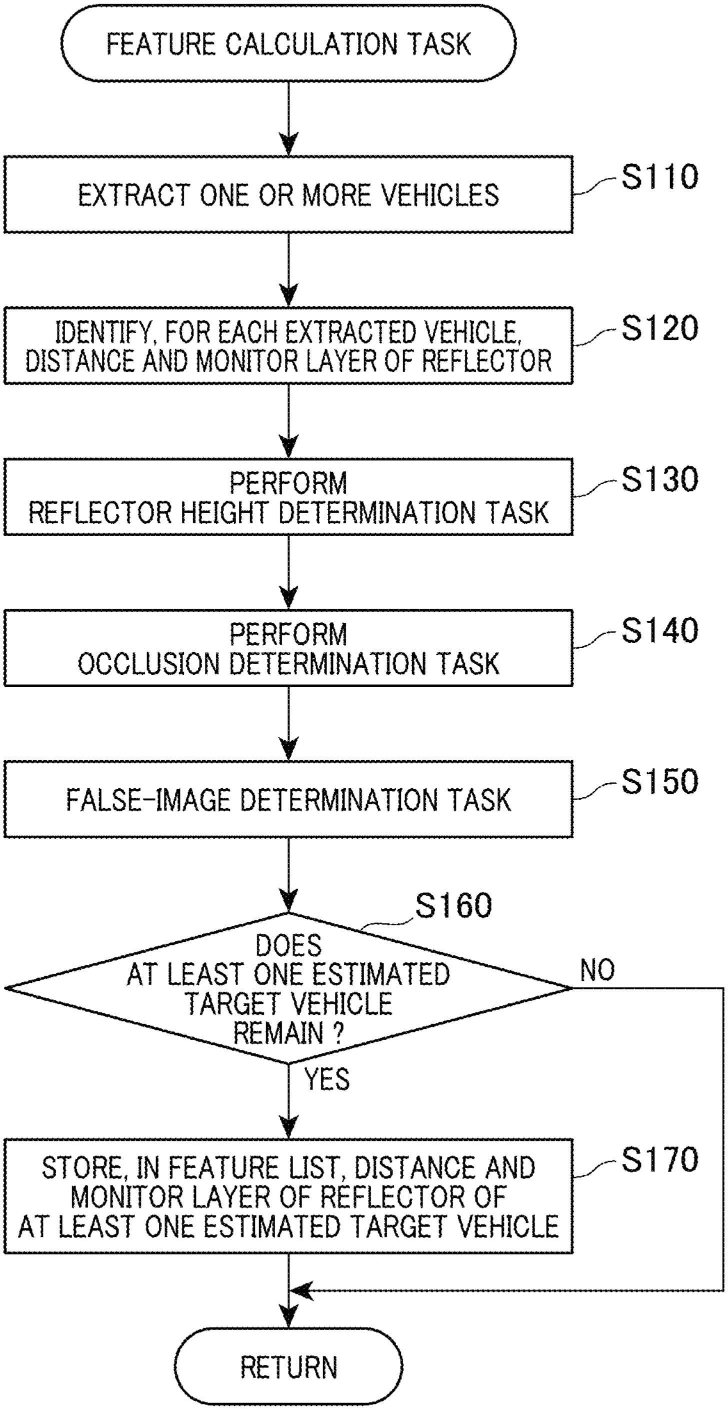
Figure 6A:
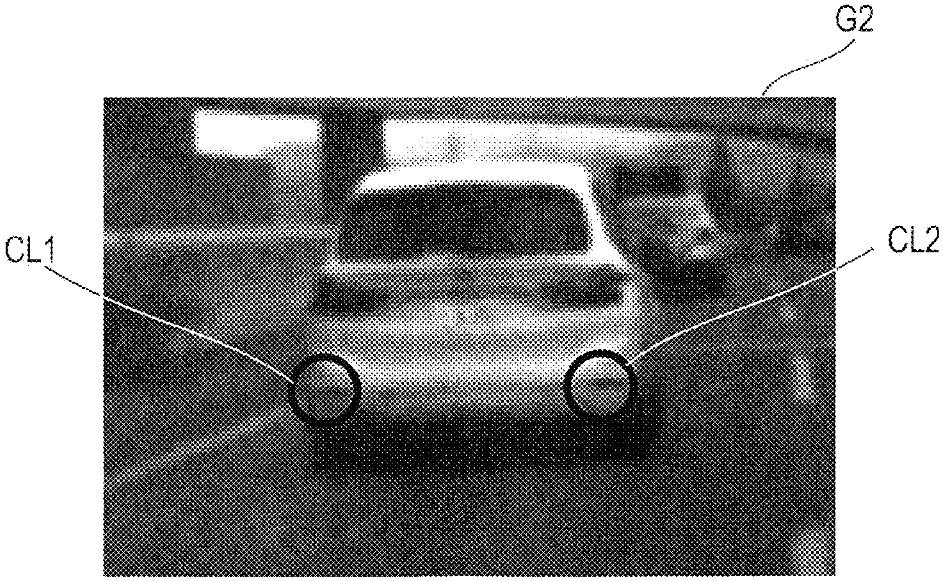
Figure 6B:
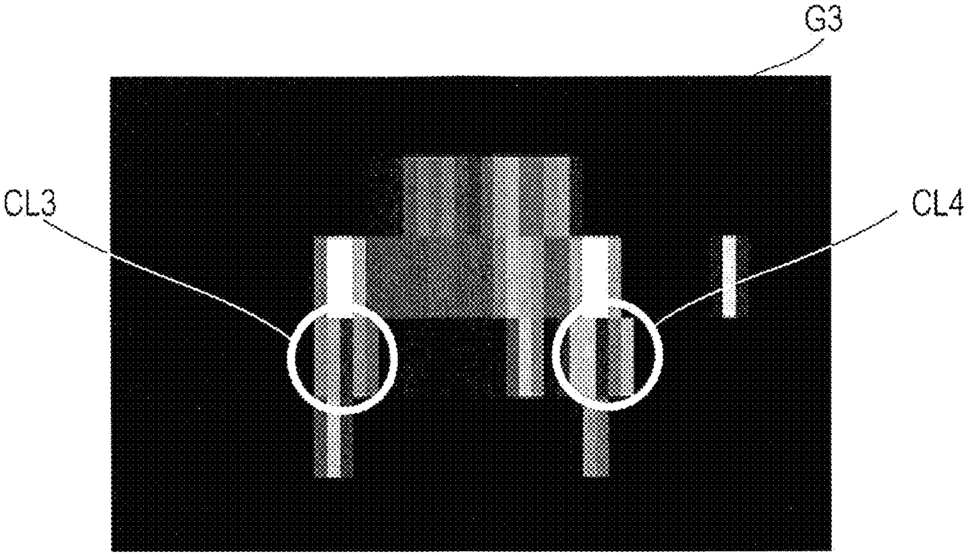
Figure 7:
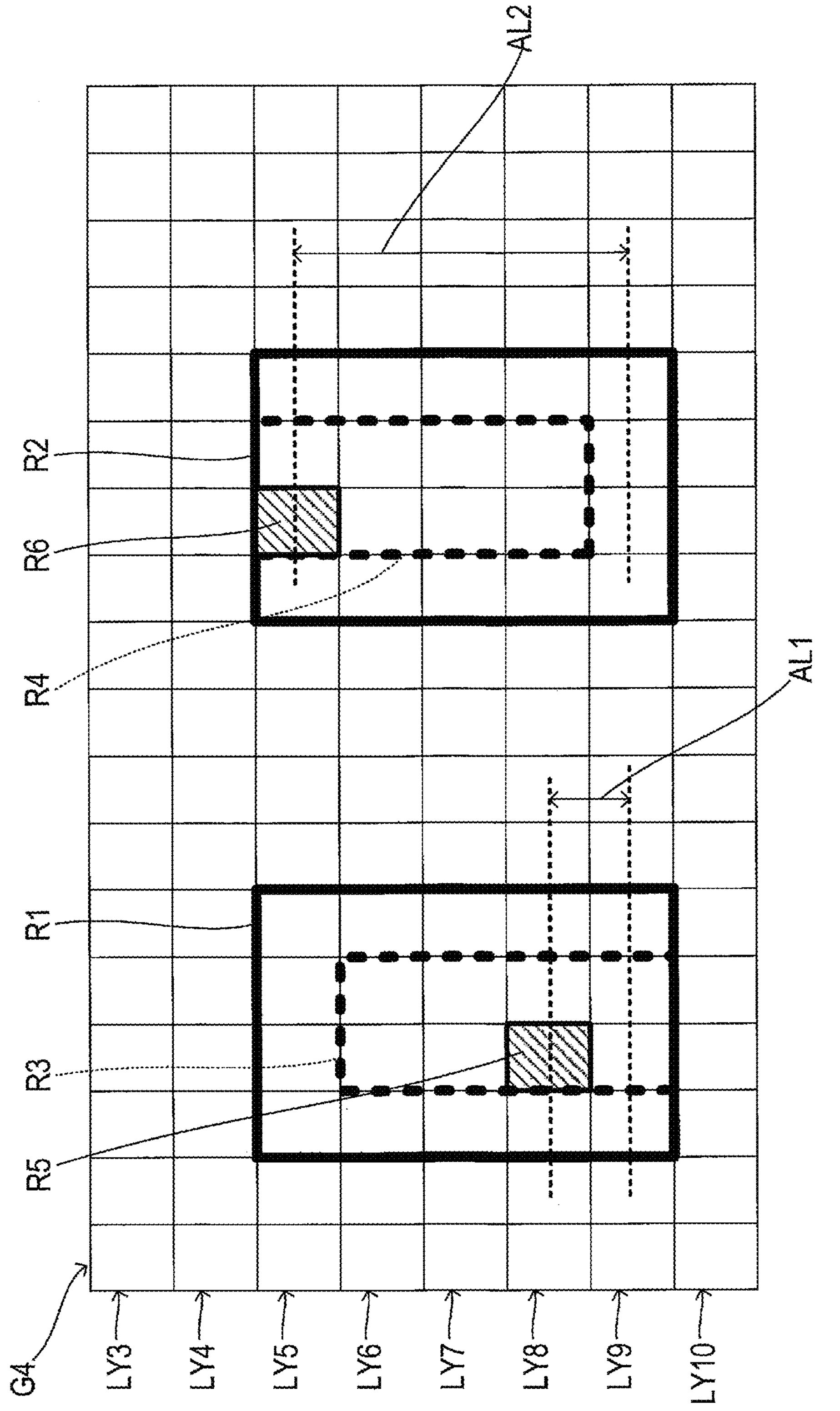
Figure 8A:
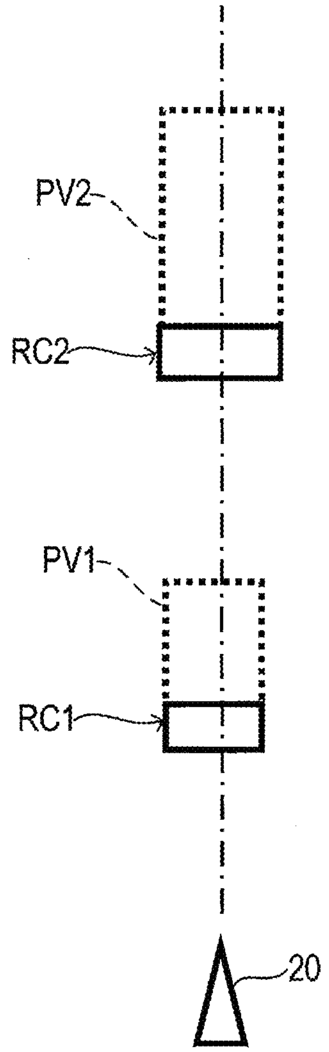
Figure 8B:
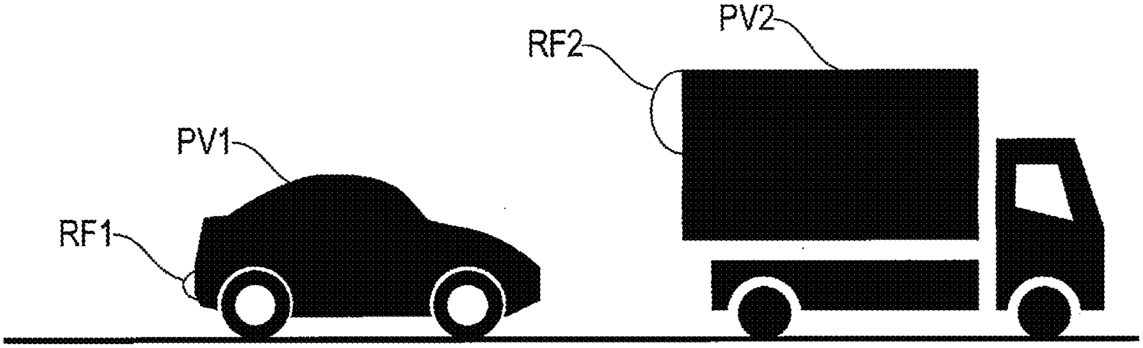
Figure 9A:
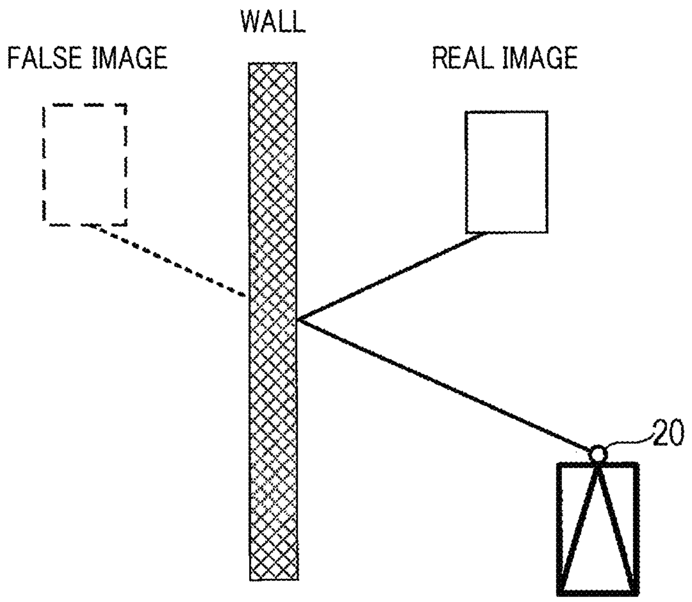
Figure 9B:
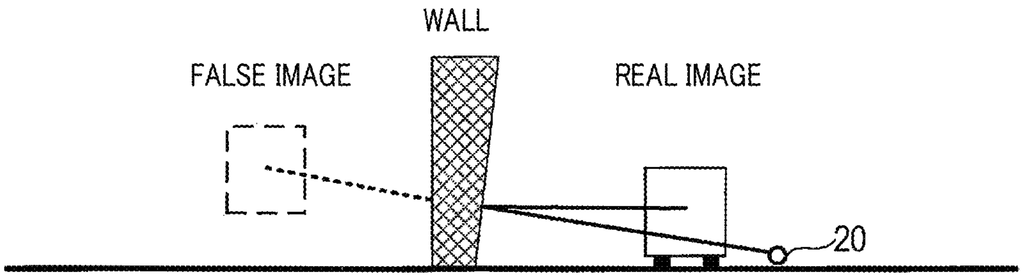
Figure 10:
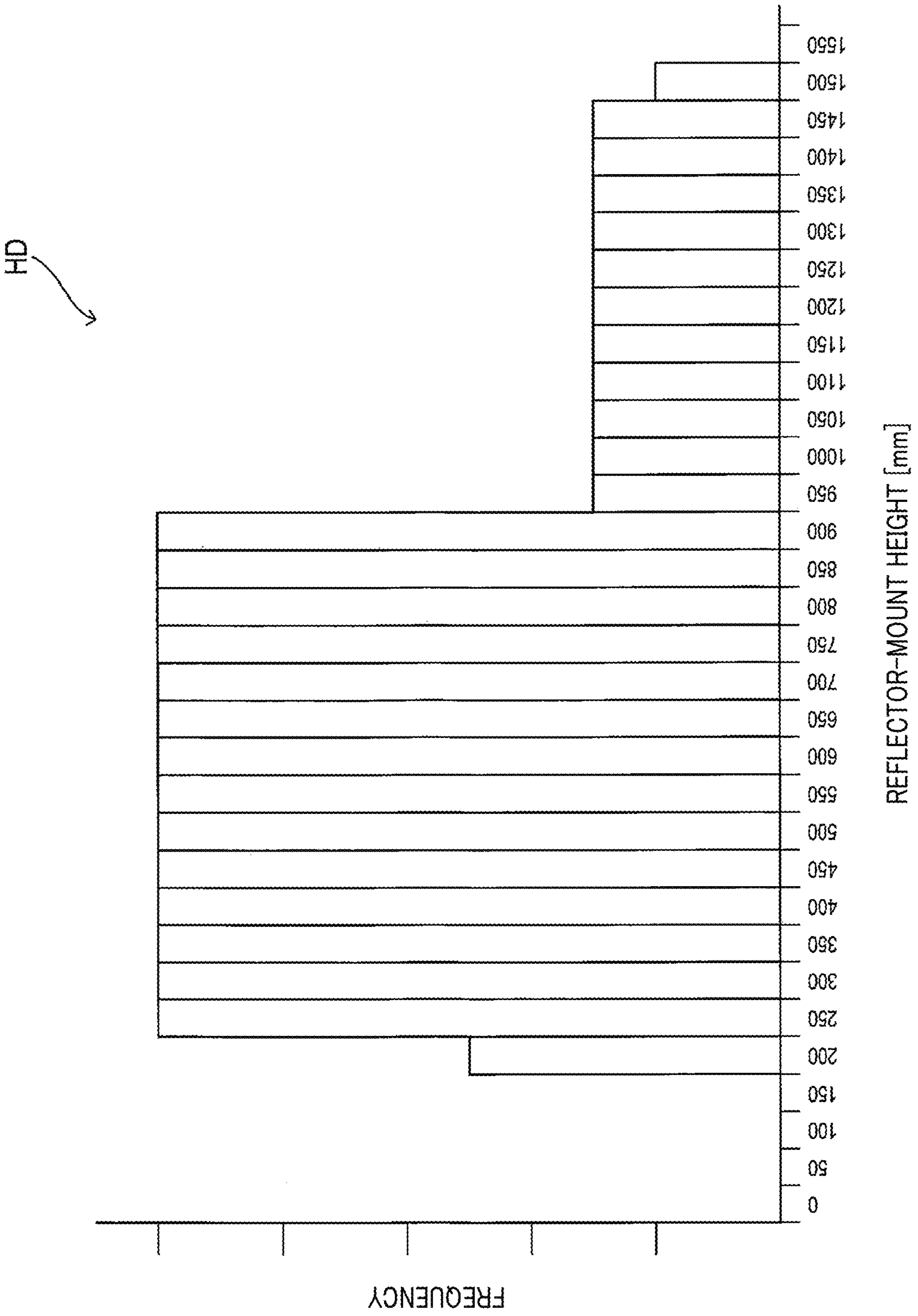
Figure 11:
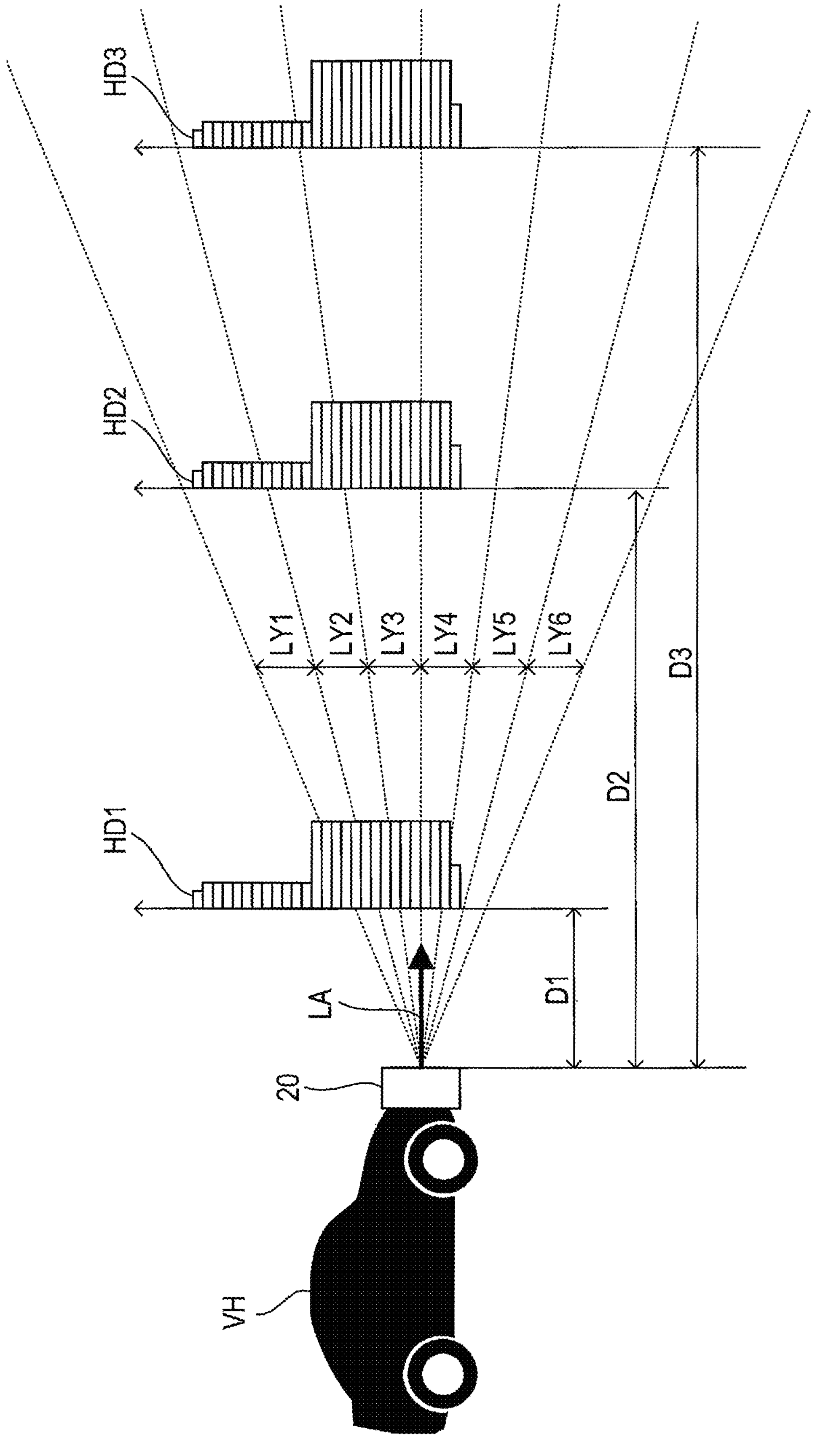
Figure 13:
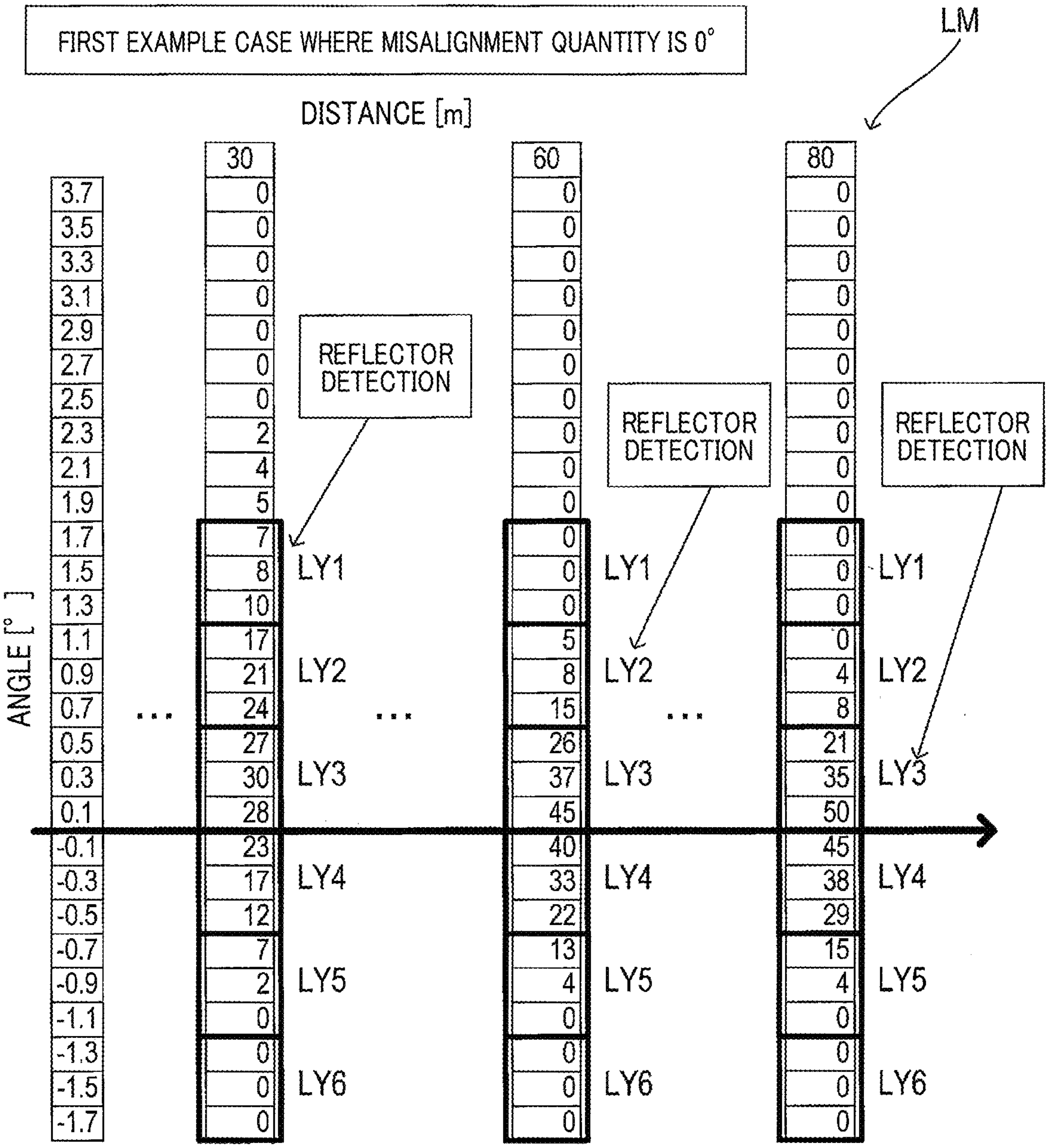
Figure 14:
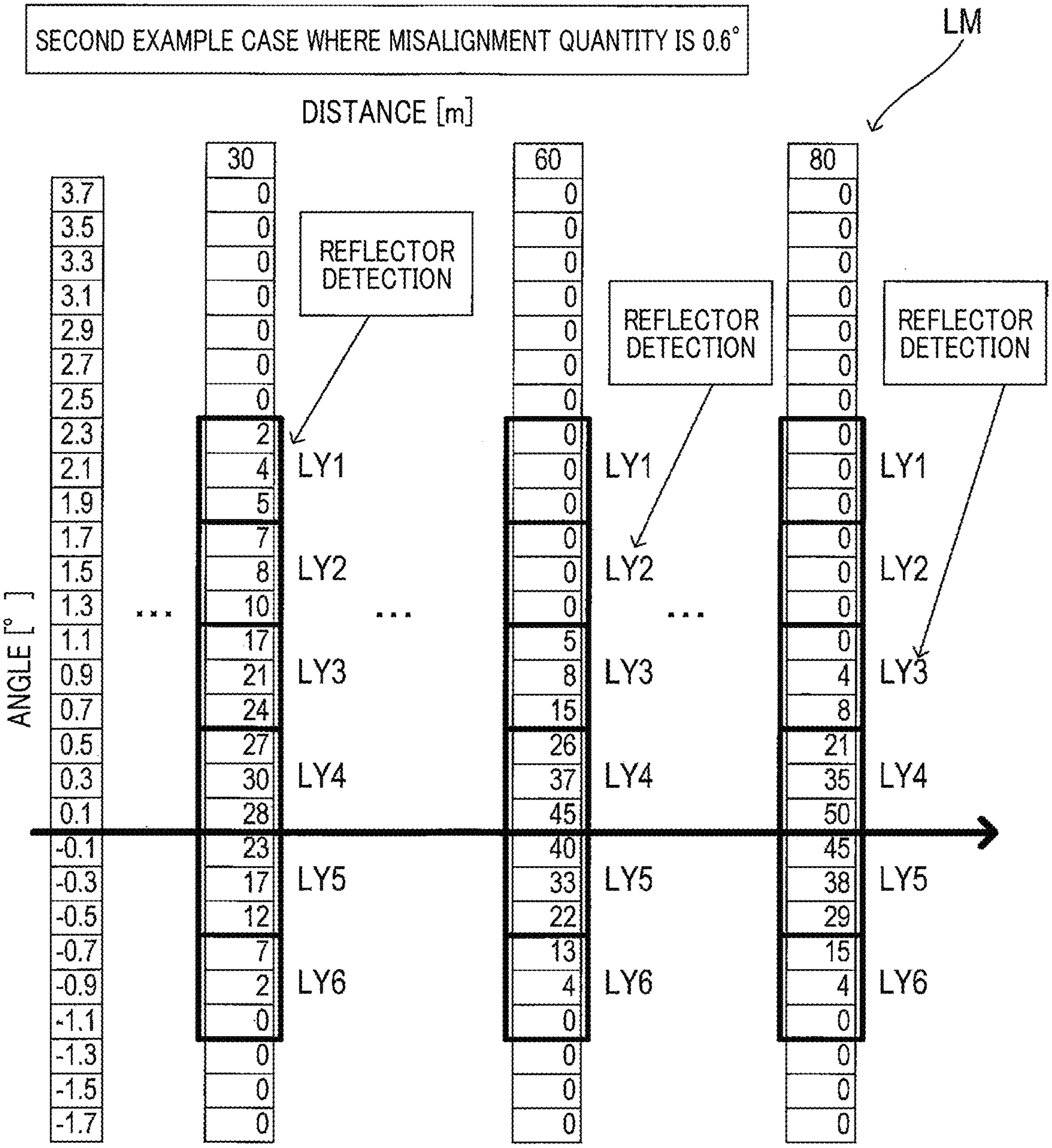
Figure 15:
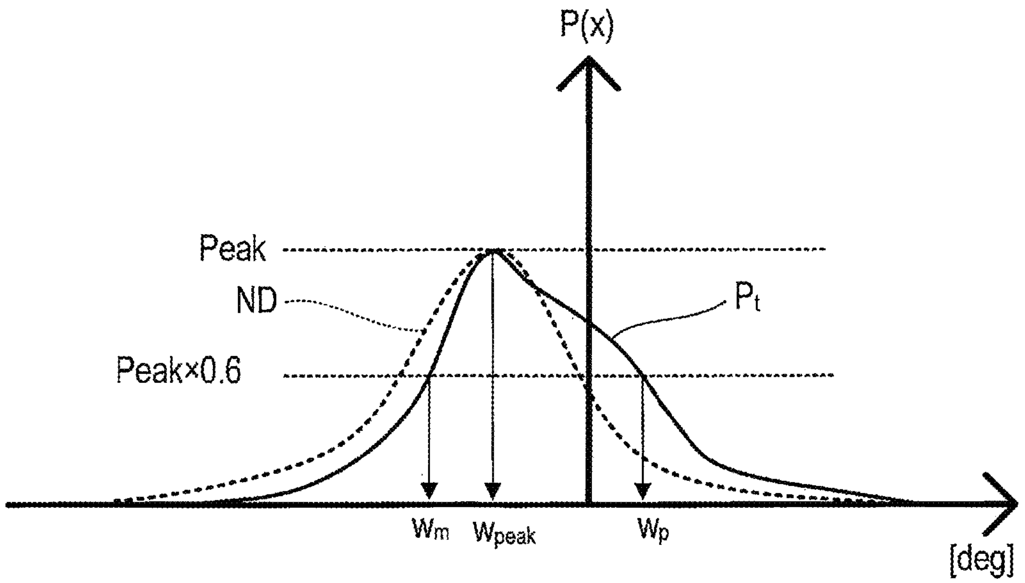

Each of FIGS. 3A and 3B is a diagram illustrating focus visual fields;

FIG. 4 is a flowchart illustrating a main routine;

FIG. 5 is a flowchart illustrating a feature calculation task included in the main routine;

FIG. 6A is a view illustrating an image of a forward four-wheel vehicle;

FIG. 6B is a view illustrating an intensity distribution image;

FIG. 7 is a diagram illustrating how a reflector-height determination task is carried out;

FIGS. 8A and 8B are views illustrating how an occlusion determination task is carried out;

Each of FIGS. 9A and 9B is a view illustrating a real image and a focal image;

FIG. 10 is a graph illustrating a reflector-mount height distribution;

FIG. 11 is a diagram illustrating how a likelihood model is calculated;

FIG. 12 is a diagram illustrating an example of a likelihood model;

FIG. 13 is a diagram illustrating how a probability of a misalignment-quantity probability distribution is calculated assuming that the misalignment quantity of a radar device is 0°;

FIG. 14 is a diagram illustrating how a probability of a misalignment-quantity probability distribution is calculated assuming that the misalignment quantity of the radar device is 0.6°; and FIG. 15 is a graph illustrating how an average and a standard deviation based on a misalignment-quantity probability distribution are calculated.

DETAILED DESCRIPTION OF EMBODIMENT

The following describes an exemplary embodiment of the present invention with reference to the accompanying drawings.

Figure 1:
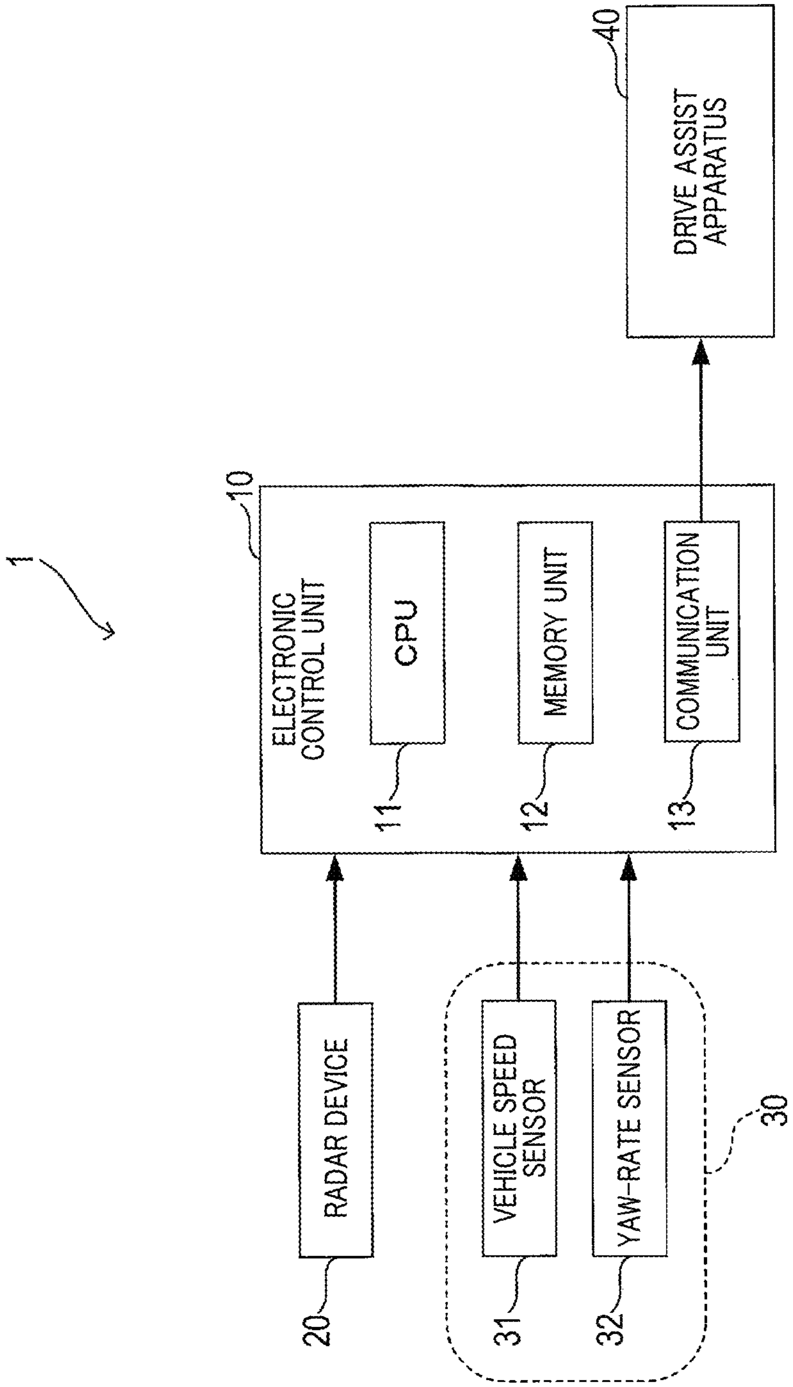
FIG. 1 is a block diagram illustrating a configuration of a vehicular obstacle-recognition apparatus.

A vehicular obstacle-recognition apparatus 1 of the exemplary embodiment includes, as illustrated in FIG. 1, an electronic control unit (ECU) 10, a radar device 20, and a sensor unit 30. The following defines a vehicle in which the vehicular obstacle-recognition apparatus 1 has been installed as an own vehicle VH.

The ECU 10 is an electronic control unit configured mainly as a microcomputer comprised of, for example, a CPU 11 and a memory unit 12; the memory unit 12 includes, for example, a ROM, a RAM, and a flash memory.

The CPU 11 is configured to run one or more programs stored in a nonvoluntary storage medium, such as the ROM, to accordingly implement one or more functions included in the ECU 10. In particular, the CPU 11 is configured to run the one or more programs stored in the nonvoluntary storage medium, such as the ROM, to accordingly implement one or more methods corresponding to the one or more programs. A part or all of the functions to be executed by the CPU 11 can be configured by one or more hardware devices, such as one or more ICs. Any number of microcomputers can constitute the ECU 10.

In addition to the CPU 11 and memory unit 12, the ECU 10 includes a communication unit 13.

The communication unit 13 is configured to communicate data with other devices installed in the own vehicle VH through one or more communication lines. For example, the communication unit 13 performs transmission and reception of data in accordance with, for example, Controller Area Network (CAN®) communications protocols.

Figure 2:
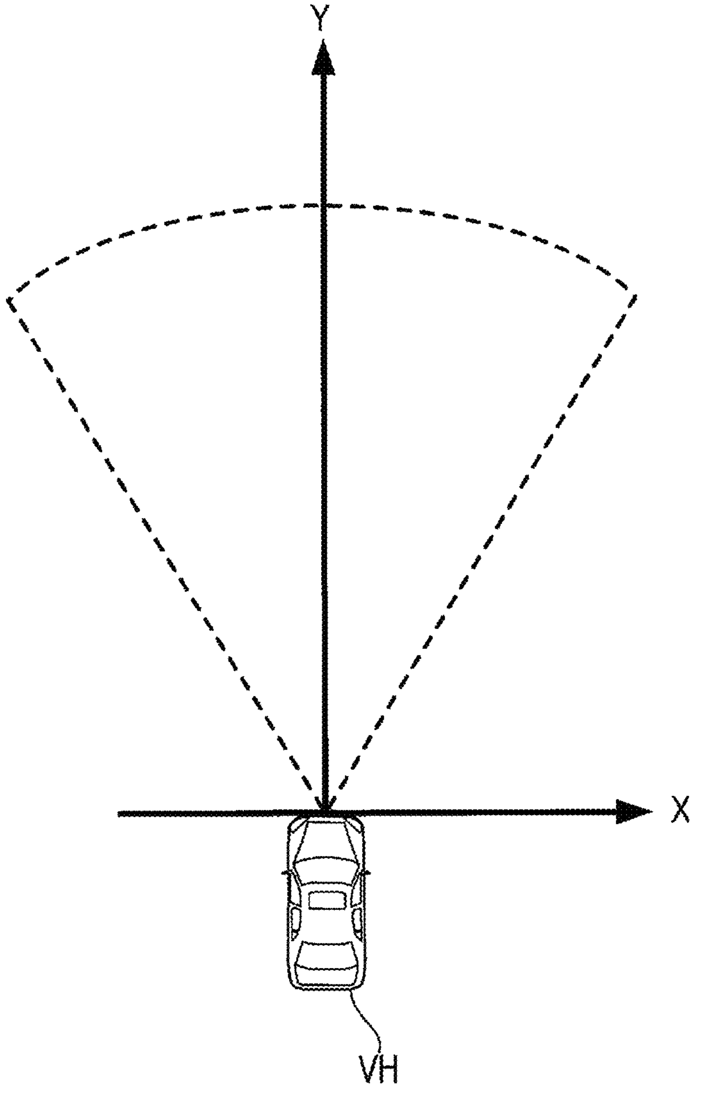
FIG. 2 is a view illustrating a radar-wave irradiation range of a radar device of the vehicular obstacle-recognition apparatus.

The radar device 20 is, as illustrated in FIG. 2, mounted to the head of the own vehicle VH. The radar device 20 is configured to perform, for each predetermined measurement cycle, a measurement task.

The measurement task transmits radar waves, i.e., radar pulses, to the front while scanning the radar waves within a predetermined horizontal range in a horizontal direction HD that is parallel to the width direction of the own vehicle VH, which will be referred to as a vehicle width direction, and a predetermined vertical range in a vertical direction that is perpendicular to the vehicle width direction, and receives reflected waves, i.e., echoes or echo pulses, resulting from reflection of the transmitted radar waves from any object. Then, the measurement task measures a range of each point (location) of the object, and horizontal and vertical angles of each point relative to the own vehicle VH; each point has reflected a corresponding one of the radar waves. Each point that has reflected a corresponding one of the radar waves will be referred to as a range point.

The predetermined measurement cycle is defined as a frame. Specifically, the radar device 20 is configured to measure, for each frame, a distance of each range point of any object, and horizontal and vertical angles of each range point relative to the own vehicle VH.

A millimeter-wave radar, which uses electromagnetic waves within a millimeter-wavelength range as the radar waves, can be used as the radar device 20. A laser radar, which uses laser waves as the radar wave, can be used as the radar device 20. A sonar, which uses sound waves as the radar waves, can be used as the radar device 20.

The radar device 20 is configured to receive echo pulse signals, and detect, in the received echo pulse signals, selected echo pulse signals that have a received signal intensity higher than a predetermined detection threshold. Then, the radar device 20 is configured to recognize the points of the object respectively corresponding to the detected selected echo pulse signals as range points. Next, the radar device 20 is configured to recognize, as a reflection intensity, an intensity level of a peak of each detected selected echo pulse signal.

The radar device 20 is additionally configured to measure, for each range point, a time tp at the peak of the detected selected echo pulse for the corresponding range point, and calculate, based on the peak time tp for each range point, a distance of the corresponding range point.

The radar device 20 is further configured to calculate, for each range point, horizontal and vertical angles of the corresponding range point relative to the own vehicle VH in accordance with horizontal and vertical scanning directions of the radar wave that serves as the basis for the corresponding detected selected echo pulse.

The radar device 20 is configured to output, to the ECU 10, range point information items for the respective range points; the range point information item for each range point includes the distance and horizontal and vertical angles of the corresponding range point. The vertical angle for each range point represents a vertical angle of the corresponding range point relative to an optical axis LA that represents a radio-wave transmission/reception direction of the radar device 20.

The ECU 10 is, as illustrated in FIG. 1, configured to transmit, to, for example, a drive assist apparatus 40 for performing drive assist of the own vehicle VH.

The sensor unit 30 includes at least one sensor for measuring the behavior of the own vehicle VH. For example, the sensor unit 30 of the exemplary embodiment includes a vehicle speed sensor 31 and a yaw rate sensor 32. The vehicle speed sensor 31 is configured to output, to the ECU 10, a vehicle-speed measurement signal indicative of a speed of the own vehicle VH, and the yaw rate sensor 32 is configured to output, to the ECU 10, a raw-rate measurement signal indicative of a yaw rate of the own vehicle VH.

The radar device 20 is, as described above, configured to detect the range points based on the horizontal and vertical scanning of the radar waves. This enables each range point to be expressed as at least one pixel included in a two-dimensional array of pixels, i.e., an intensity distribution image, G1 illustrated in FIG. 3A; the two-dimensional array of pixels G1 can be created by the horizontal and vertical scanning of the radar waves.

Specifically, if a pixel in the two-dimensional array of pixels G1 corresponds to a range point, the pixel includes distance information on the distance of the range point, and intensity information on the reflection intensity of the range point. Alternatively, if a pixel in the two-dimensional array of pixels G1 corresponds to plural detected echo signals, i.e., plural range points, the pixel includes distance information items on the distances of the respective range points, and intensity information on the reflection intensities of the respective range points.

The two-dimensional array of pixels G1 has a horizontal-directional axis corresponding to the horizontal scanning of the radar waves, and a vertical-directional axis corresponding to the vertical scanning of the radar waves. The two-dimensional array of pixels G1 has an intersection point O between the horizontal-directional axis and the vertical-directional axis. The intersection point O corresponds to a range point located on an extension of the optical axis LA of the transmitted radar waves and corresponding echoes.

FIG. 3B illustrates that the optical axis LA is misaligned upwardly with a horizontal plane extending parallel to the horizontal direction HD. When the optical axis LA is aligned with the alignment direction parallel to the horizontal direction HD, there is no misalignment of the radar device 20.

That is, the two-dimensional array of pixels G1 represents a visual field monitorable by the radar device 20. The ECU 10 is configured to select a part of the two-dimensional array of pixels G1 as a focus visual field, and detect one or more objects viewed in the focus visual field.

The two-dimensional array of pixels G1 illustrated in FIG. 3A is for example comprised of a matrix with 26 pixels in the horizontal direction and 16 pixels in the vertical direction. In FIG. 3A, two focus visual fields selectable by the ECU 10 are illustrated as FV1 and FV2, and each of the focus visual fields FV1 and FV2 is comprised of a matrix with 22 pixels in the horizontal direction and 10 pixels in the vertical direction.

The focus visual field FV1, which has a center line LC1 in the vertical direction, is arranged with the center line LC1 aligned with the optical axis LA. In contrast, the focus visual field FV2, which has a center line LC2 in the vertical direction, is arranged to be lower than the focus visual field FV2 in the vertical direction.

FIG. 3B illustrates that the focus visual field FV1 selected by the ECU 10 is misaligned upwardly with the horizontal plane extending parallel to the horizontal direction HD. In this situation, changing the focus visual field FV1 to a lower focus visual field, such as the focus visual field FV2, enables the misalignment of the optical axis LA with respect to the horizontal plane parallel to the horizontal direction HD to be corrected.

Specifically, the ECU 10 is configured to change the location of the focus visual field to another location in the visual field G1 to accordingly correct the misalignment of the radar device 20.

Each of the focus visual fields FV1 and FV2 has a first row, a second row, . . . , and a tenth row in the vertical direction. The first row, second row, . . . , and tenth row of each of the focus visual fields FV1 and FV2 will be defined as a first monitor layer LY1, a second monitor layer LY2, . . . , and a tenth monitor layer LY10. For example, FIG. 3A illustrates the first to tenth monitor layers LY1 to LY10 in the focus visual field FV1. Next, the following describes the procedure of a main routine executable by the ECU 10. The ECU 10 is programmed to repeatedly execute the main routine every measurement cycle (frame).

When starting the main routine, the CPU 11 of the ECU 10 performs an object tracking task in step S10 of FIG. 4.

Specifically, the CPU 11 calculates, for each of the range points of objects detected and recognized by the radar device 20 in a latest measurement frame, such as a current measurement frame, a lateral position and a longitudinal position of the corresponding one of the range points in accordance with the distance and the horizontal and vertical angles of the corresponding one of the range points.

The lateral position of any range point represents a position of the range point in the vehicle width direction relative to the own vehicle VH. The longitudinal position of any range point represents a position of the range point in the longitudinal direction of the own vehicle VH vertical direction perpendicular to the vehicle width direction relative to the own vehicle VH.

In step S10, the CPU 11 performs a historical tracking task.

The range points of objects detected and recognized in the current measurement frame will be referred to as current range points. Similarly, the range points of objects detected and recognized in the immediately previous measurement frame will be referred to as previous range points.

The historical tracking task is programmed to determine, for each current range point, whether the corresponding current range point and a corresponding one of the previous range points indicate a same object.

The following describes the historical tracking task.

Specifically, the CPU 11 calculates, based on information on each previous range point, a predicted position for each current range point, and calculates, for each current range point, a deviation between the actual position of the corresponding current range point and the predicted position of the corresponding current range point.

Then, the CPU 11 determines whether the deviation for each current range point is smaller than a predetermined upper limit. In response to determination that the deviation for any current range point is smaller than the predetermined upper limit, the CPU 11 determines that the current range point maintains continuous history between the current and immediately-previous measurement cycles.

In particular, when determining that any current range point, which has been determined to maintain continuous history for plural measurement frames, such as five frames, including the current measurement frame, the CPU 11 recognizes that selected current range points, each of which maintains continuous history for the plural measurement frames, represent one or more target objects recognized in the current measurement frame, which will be referred to as current recognized objects. The selected current range points represent one or more target objects will be referred to as target current range points. Note that one or more target objects recognized similarly to the current measurement frame will be referred to as previous recognized objects.

Additionally, the CPU 11 calculates, for each current range point, a relative speed of the corresponding range point in accordance with the calculated deviation for the corresponding current range point and a length of the measurement cycle, i.e., a time length of each measurement frame.

Next, the CPU 11 selects, in the target current range points, target current range points that satisfy a predetermined same-object selection condition; the selected target current range point will be referred to as same-object range points.

The same-object selection condition, which is previously defined for selecting the same-object range points that are based on a same object according to the exemplary embodiment, can include the following example condition.

The following describes the example condition.

As the basis for the example condition, one of the target current range points, which is closer to the own vehicle VH than any other target current range points, is defined as a representative range point. The example condition for any target current range point is defined such that (I) An absolute difference in distance between the representative range point and the target current range point is smaller than a predetermined distance selection threshold (II) An absolute difference in horizontal angle between the representative range point and the target current range point is smaller than a predetermined horizontal-angle selection threshold (III) An absolute difference in vertical angle between the representative range point and the target current range point is smaller than a predetermined vertical-angle selection threshold (IV) An absolute difference in relative-speed between the representative range point and the target current range point is smaller than a predetermined relative-speed selection threshold Accordingly, plural range point groups, each of which is comprised of the same-object range points, are recognized.

Next, the CPU 11 extracts, based on the lateral position of each of the same-object range points for each range point group, one of the same-object range points, which is located rightmost as a rightmost range point. Similarly, the CPU 11 extracts, based on the lateral position of each of the same-object range points for each range point group, one of the plural same-object range points, which is located leftmost as a leftmost range point.

Then, the CPU 11 calculates, for each range point group, the center position of the lateral position of the rightmost range point and the lateral position of the leftmost range point as a lateral center position x of a same object for the corresponding range point group. Next, the CPU 11 calculates, for each range point group, an absolute difference between the lateral position of the rightmost range point and the lateral position of the leftmost range point as a lateral width of the same object for the corresponding range point group.

Additionally, the CPU 11 extracts, based on the longitudinal position of each of the same-object range points for each range point group, one of the same-object range points, which is located frontmost as a frontmost range point for the corresponding range point group. Similarly, the CPU 11 extracts, based on the longitudinal position of each of the same-object range points for each range point group, one of the same-object range points, which is located rearmost as a rearmost range point for the corresponding range point group.

Then, the CPU 11 calculates, for each range point group, the center position of the longitudinal position of the frontmost range point and the longitudinal position of the rearmost range point as a longitudinal center position y of the same object for the corresponding range point group. Next, the CPU 11 calculates, for each range point group, an absolute difference between the longitudinal position of the frontmost range point and the longitudinal position of the rearmost range point as a longitudinal width of the same object for the corresponding range point group, That is, the CPU 11 can recognize, for each range point group, a rectangle that surrounds the rightmost range point, the leftmost range point, the frontmost range point, and the rearmost range point as a currently recognized object for the corresponding range point group.

In other words, at least one of the previously recognized objects and a corresponding at least one of the currently recognized objects maintain continuous history with respect to one another.

Specifically, when determining, based on the results of the historical tracking task, that each of the previously recognized objects maintains continuous history with respect to a corresponding one of the currently recognized objects, the CPU 11 calculates a lateral relative speed Vx and a longitudinal relative speed Vy of each currently recognized object relative to the own vehicle VH in accordance with (i) the lateral and longitudinal center positions x and y of the corresponding currently recognized object, (ii) the lateral and longitudinal center positions x and y of the corresponding previously recognized object, and (iii) the length of the measurement cycle, i.e., the time length of each measurement frame.

Otherwise, when determining, based on the results of the historical tracking task, that at least one previously recognized object and any of the currently recognized objects do not maintain continuous history with respect to each other, the CPU 11 determines that the at least one previously recognized object has missed, and calculates a lateral center position x, a longitudinal center position y, a lateral relative speed vx, and a lateral relative speed vy of at least one currently recognized object corresponding to the at least one previously recognized object, i.e., missing object, based on extrapolation of the lateral center position x, longitudinal center position y, lateral relative speed vx, and lateral relative speed vy of the corresponding at least one previously recognized object.

When the object tracking task in step S10 has completed, the CPU 11 performs a feature calculation task in step S20.

The following describes how the CPU 11 performs the feature calculation task.

When starting the feature calculation task, the CPU 11 extracts, from the currently recognized objects recognized in step S10, one or more vehicles in accordance with a predetermined vehicle extraction condition in step S110 of FIG. 5.

The vehicle extraction condition, which is used to determine that any currently recognized object is a vehicle, is defined such that (I) The lateral center position x of the currently recognized object lies within a predetermined range from −2.5 m to 2.5 m inclusive (II) The longitudinal center position y of the currently recognized object lies within a predetermined range from 30 m to 150 m inclusive (III) A longitudinal absolute speed of the currently recognized object is lower than or equal to 40 km/h The longitudinal absolute speed of any currently recognized object represents the sum of the longitudinal relative speed vy and the speed of the own vehicle VH.

Following the operation in step S110, the CPU 11 identifies the distance of at least one reflector of each vehicle extracted in step S110 relative to the own vehicle VH, and a monitor layer in which one or more ranging points corresponding to the at least one reflector are located in step S120 of FIG. 5.

The following describes the operation in step S120.

FIG. 6A illustrates an image G2 of a forward four-wheel vehicle traveling in front of the own vehicle VH, which is captured by a camera included in the sensor unit 30 of the own vehicle VH. Reflectors of the forward four-wheel vehicle are shown in respective circled regions CL1 and CL2 of the image G2.

FIG. 6B illustrates an intensity distribution image G3 created by the radar device 20 set forth above. A circled region CL3 in the intensity distribution image G3 represents one or more range points corresponding to one of the reflectors, and a circled region CL4 in the intensity distribution image G3 shows one or more range points corresponding to the other of the reflectors.

The CPU 11 extracts, from the range points constituting each vehicle extracted in step S110, which are included in a selected focus visual field of the intensity distribution image, reflector-candidate range points, each of which has a reflection intensity higher than or equal to a predetermined reflector-determination threshold in step S120.

In other words, the CPU 11 extracts, from the pixels of a selected focus visual field of the intensity distribution image, one or more vehicle-based range-point regions, i.e., one or more vehicle-based pixel regions, in accordance with the predetermined vehicle extraction condition in step S110. Next, the CPU 11 extracts, from the pixels constituting each vehicle-based pixel region, a reflector-candidate pixel region, each pixel of which has a reflection intensity higher than or equal to the predetermined reflector-determination threshold in step S120.

Then, the CPU 11 identifies, in step S120, one of the reflector-candidate range points, which has the highest reflection intensity in all the reflector-candidate range points, as a reflector-based range point. In other words, the CPU 11 identifies, in step S120, one of the reflector-candidate pixels, which has the highest reflection intensity in all the reflector-candidate pixels, as a reflector-based pixel.

In step S120, the CPU 11 identifies the distance of the reflector-based range point, i.e., the distance of the reflector-based pixel, as the distance to the at least one reflector of each extracted vehicle relative to the own vehicle VH. In step S120, the CPU 11 identifies, as a reflector-monitored layer, one of the monitor layers in the selected focus visual field in accordance with (i) the distance to the at least one reflector of each extracted vehicle relative to the own vehicle VH and (ii) the horizontal and vertical angles of the reflector-based range point.

For example, FIG. 7 illustrates the selected focus visual field of the reflection intensity image, which will be referred to as a selected visual-field image G4. In the selected visual-field image G4, first and second extracted vehicles are shown. A rectangular region R1 shown in the selected visual-field image G4 represents the vehicle-based pixel region of the first extracted vehicle, and a rectangular region R2 shown in the selected visual-field image G4 represents the vehicle-based pixel region of the second extracted vehicle.

A rectangular region R3 shown in the selected visual-field image G4 represents the reflector-candidate pixel region of the first extracted vehicle, each pixel of which has a reflection intensity higher than or equal to the predetermined reflector-determination threshold. A rectangular region R4 shown in the selected visual-field image G4 represents the reflector-candidate pixel region of the second extracted vehicle, each pixel of which has a reflection intensity higher than or equal to the predetermined reflector-determination threshold.

A rectangular region R5 shown in the selected visual-field image G4 represents the reflector-based pixel of the first extracted vehicle. A rectangular region R6 shown in the selected visual-field image G4 represents the reflector-based pixel of the second extracted vehicle.

Then, the CPU 11 performs a reflector height determination task in step S130 of FIG. 5.

Specifically, the CPU 11 identifies, in the vehicle-based pixel region of each extracted vehicle shown in the selected focus visual field, the monitor layer in which the lowermost portion of the at least one vehicle is located as a lowermost monitor layer in step S130. Additionally, the CPU 11 identifies, in the vehicle-based pixel region of each extracted vehicle shown in the selected focus visual field, the monitor layer in which the reflector-based pixel is located as a reflector monitor layer in step S130.

Then, the CPU 11 calculates the number of one or more monitor layers located between the lowermost monitor layer and the reflector monitor layer as a height layer number.

For example, in the selected visual-field image G4 illustrated in FIG. 7, the lowermost monitor layer of the first extracted vehicle is the ninth monitor layer LY9, and the reflector monitor layer of the first extracted vehicle is the eighth monitor layer LY8. Similarly, in the selected visual-field image G4 illustrated in FIG. 7, the lowermost monitor layer of the second extracted vehicle is the ninth monitor layer LY9, and the reflector monitor layer of the second extracted vehicle is the fifth monitor layer LY5. This results in the height layer number of the first extracted vehicle is 1 indicated by arrow AL1, and the height layer number of the second extracted vehicle is 5 indicated by arrow AL2.

The CPU 11 calculates, for each extracted vehicle shown in the selected focus visual field, the height of the at least one reflector in accordance with (i) the distance of the at least one range point located in the lowermost monitor layer, and (ii) the height layer number. Then, the CPU 11 determines, for each extracted vehicle shown in the selected focus visual field, whether the height of the at least one reflector exceeds a predetermined exclusion height threshold, such as 1.5 m. In response to determination that the height of the at least one reflector of at least one extracted vehicle exceeds the predetermined exclusion height threshold, the CPU 11 excludes the at least one extracted vehicle from the extracted vehicles, and sets the remaining extracted vehicles whose reflector heights do not exceed the predetermined exclusion height threshold as estimated target vehicles, i.e., estimated target-vehicle images.

After completion of the reflector height determination task in step S130, the CPU 11 performs an occlusion determination task in step S140 of FIG. 5.

An occlusion situation is that, for example illustrated in FIGS. 8A and 8B, assuming that a first preceding vehicle PV1 is located in front of the radar device 20 of the own vehicle VH, and a second preceding vehicle PV2 is located in front of the first vehicle VH, a part of the second preceding vehicle PV2 is occluded by the first preceding vehicle PV1 when viewed from the radar device 20.

The CPU 11 performs the occlusion determination task to accordingly determine whether there is at least one vehicle included in the estimated target vehicles, which is partly occluded by another estimated target vehicle. In response determination that there is at least one vehicle included in the estimated target vehicles, which is partly occluded by another estimated target vehicle, the CPU 11 excludes the at least one vehicle from the estimated target vehicles.

The following describes an example of the occlusion determination task.

As illustrated in FIGS. 8A and 8B, let us assume that the CPU 11 recognizes a rectangular object RC1, which represents a pixel region based on the first preceding vehicle PV1, and a rectangular object RC2, which represents a pixel region based on the second preceding vehicle PV2. A direction of the rectangular object RC1 viewed from the radar device 20 is substantially aligned with that of the rectangular object RC2 viewed from the radar device 20. A distance of the rectangular object RC2 relative to the radar device 20 is longer than that of the rectangular object RC1 relative to the radar device 20. This situation makes it possible for the CPU 11 to determine that a part of the second preceding vehicle PV2 is occluded by the first preceding vehicle PV1.

There is a possibility that the at least one reflector of the second preceding vehicle PV2 occluded by the first preceding vehicle PV1 is occluded by the first preceding vehicle PV1. Calculating a misalignment quantity of the radar device 20 based on a misrecognized reflector-based range point that is misrecognized as a range point of the at least one reflector might reduce the calculation accuracy of the misalignment quantity. For this reason, the occlusion determination task makes it possible to exclude, from the estimated target vehicles, at least one estimated target vehicle, i.e., the second preceding vehicle PV2, that is partly occluded by another of the estimated target vehicles. In contrast, the CPU 11 maintains, as the estimated target vehicles, the remaining vehicles, for example, the first preceding vehicle PV1, upon determination that the remaining vehicles are not occluded by any other vehicle, so that the at least one reflector of each of the remaining vehicles is not occluded by any other vehicle.

When the operation in step S140 has completed, the CPU 11 performs a false-image determination task in step S150. A false image, is, as illustrated in FIGS. 9A and 9B, is a false object image misrecognized based on radar waves, which have been (i) transmitted by the radar device 20, (ii) thereafter reflected by a stationary object, such as a tunnel or a wall in FIGS. 9A and 9B, (ii) thereafter reflected by an object, (iv) thereafter reflected by the stationary object, and (v) thereafter received by radar device 20.

Such a false image of an object may be monitored to be offset in the height direction of the own vehicle VH relative to the real image of the object due to positional relationships between the object and the stationary object (see FIG. 9B). For this reason, if such a false image of an object were learned as an estimated target vehicle set forth above, the calculation accuracy of the misalignment quantity of the radar device 20 might be reduced. Note that FIG. 9A illustrates the real image and false image when viewed from above of the radar device 20, and FIG. 9B illustrates the real image and false image when viewed from the rear of the radar device 20.

Specifically, the CPU 11 identifies, in the estimated target-vehicle images, at least one pair of images that satisfy a predetermined pair determination condition, and extracts, from the identified images of the at least one pair, one of the identified images, which has a lower reflection intensity than the other thereof, as a false image. The pair determination condition is defined based on the following feature between real and false images of any object detected by the radar device 20.

Specifically, each of a real image and a false image of any object has a distance and a relative speed relative to the radar device 20. The absolute difference in distance between the false image and the real image is smaller than or equal to a predetermined threshold, such as 5 m, and the absolute difference in relative speed between the false image and the real image is smaller than or equal to a predetermined threshold, such as km/h.

The CPU 11 extracts, from the estimated-target vehicles, i.e., the estimated target-vehicle images, at least one image that satisfies the pair determination condition so as to be determined as at least one false image by the false-image determination task. Then, the CPU 11 excludes, from the estimated-target vehicles, i.e., the estimated target-vehicle images, the at least one false image extracted by the false-image determination task.

When the operation in step S150 has completed, the CPU 11 determines, in step S160, whether one or more estimated target vehicle remain without being excluded by the operations in steps S130 to S150. In response to determination that no estimated target vehicles remain (NO in step S160), the CPU 11 terminates the feature calculation task, and returns to the main routine.

Otherwise, in response to determination that one or more estimated target vehicles remain (YES in step S160), the CPU 11 retrieves the distance and the monitor layer of each of the at least one reflector of each estimated target vehicle as a feature of the corresponding estimated target vehicle, and stores the retrieved feature of each estimated target vehicle in a feature list prepared in the memory unit 12 in step S170. The CPU 11 thereafter terminates the feature calculation task, and returns to the main routine.

When the feature calculation task has completed, the CPU 11 determines whether all predetermined calculability determination conditions are satisfied in step S30 of FIG. 4. The predetermined calculability determination conditions include a first determination condition, a second determination condition, and a third determination condition.

The first determination condition is that the speed of the own vehicle VH is higher than or equal to a predetermined threshold speed of, for example, 40 km/h, which is measured by the vehicle speed sensor 31.

The second determination condition is that the own vehicle VH is traveling straight ahead. Whether the own vehicle VH is traveling straight ahead can be determined based on whether the radius of curvature of the road on which the own vehicle VH is traveling is more than or equal to a predetermined threshold radius of, for example, 1500 m. Specifically, when the radius of curvature of the road on which the own vehicle VH is traveling is more than or equal to the predetermined threshold radius, it is determined that the own vehicle VH is traveling straight ahead.

The third determination condition is that the distance and monitor layer of the at least one reflector of each estimated target vehicle has been stored in the memory unit 12. The distance of the at least one reflector will be referred to as a reflector distance, and the monitor layer of the at least one reflector will also be referred to as a reflector monitor layer. That is, the reflector distance and the reflector monitor layer are stored in the memory unit 12.

In response to determination that at least one of the predetermined calculability determination conditions is not satisfied (NO in step S30), the main routine proceeds to step S70. Otherwise, in response to determination that all the predetermined calculability determination conditions are satisfied (YES in step S30), the CPU 11 calculates a misalignment quantity distribution in step S40.

The following describes the misalignment quantity distribution.

Heights of reflectors mounted to vehicles, which will be referred to as reflector-mount heights, vary among the vehicles. An allowable range for reflector-mount heights is previously defined in accordance with safety regulations (safety standards). For example, in Japan, the allowable range for reflector-mount heights is defined in Article 210 of Announcement that Prescribes Details of Safety Regulations for Road Vehicles. In United States, the allowable range for reflector-mount heights is defined in Federal Motor Vehicle Safety Standard.

In accordance with the reflector-mount height and sales for each of sold vehicle models, a reflector-mount height distribution can be previously calculated as a graph in FIG. 10 (see reference character HD).

The horizontal axis of the graph shows each available value of the reflector-mount height, and the vertical axis of the graph shows a corresponding frequency of each available value of the reflector-mount height. The available values of the reflector-mount height distribution HD illustrated in FIG. 10 are distributed within a predetermined range from 200 mm to 1500 mm inclusive.

In accordance with the reflector-mount height distribution HD, the height, i.e., radar-mount height, of the radar device 20 mounted to the own vehicle VH, and the monitor layers of the focus visual field, for example, the focus visual field FV1, a likelihood model LM has been created. The likelihood model LM defines, assuming that there is no misalignment in the radar device 20, an existence likelihood, i.e., an existence probability, of a reflector at each specified value of distance relative to the radar device 20 in each monitor layer, i.e., each vertical angular range of the corresponding monitor layer.

Specifically, dividing forward distance relative to the radar device into plural distance sections and arranging the reflector-mount distribution at each of the plural distance sections enable the likelihood model LM to be calculated.

For the sake of simple descriptions, the focus visual field FV1 is, as illustrated in FIG. 11, comprised of the first, second, third, fourth, fifth, and sixth monitor layers LY1, LY2, LY3, LY4, LY5, and LY6 from above. Each of the first to sixth monitor layers LY1 to LY6 has a constant vertical angular range.

For example, the reflector-mount distribution, which is referred to as HD1, located at a value D1 of distance relative to the radar device 20 shows that the reflector existence likelihoods in the respective first to fourth monitor layers LY1 to LY4 are higher than those in the other monitor layers LY5 and LY6, and the reflector existence likelihood in the fifth monitor layer LY5 is the second lowest in all the monitor layers LY1 to LY6, and the reflector existence likelihood in the sixth monitor layer LY6 is the first lowest of 0 in all the monitor layers LY1 to LY6.

For example, the reflector-mount distribution, which is referred to as HD2, located at a value D2 of distance relative to the radar device 20 shows that each of the reflector existence likelihoods in the fifth and sixth monitor layers LY5 and LY6 is the first lowest of 0 in all the monitor layers LY1 to LY6, the reflector existence likelihood in the fourth layer LY4 is the second lowest in all the monitor layers LY1 to LY6, and the reflector existence likelihood in the first monitor layer LY1 is the third lowest in all the monitor layers LY1 to LY6. The reflector existence likelihood in the third monitor layer LY3 is the highest in all the monitor layers LY1 to LY6.

For example, the reflector-mount distribution, which is referred to as HD3, located at a value D3 of distance relative to the radar device 20 shows that each of the reflector existence likelihoods in the first, fifth, and sixth monitor layers LY1, LY5, and LY6 is the first lowest of 0 in all the monitor layers LY1 to LY6, the reflector existence likelihood in the second layer LY2 is the second lowest in all the monitor layers LY1 to LY6, and the reflector existence likelihood in the fourth monitor layer LY4 is the third lowest in all the monitor layers LY1 to LY6. The reflector existence likelihood in the third monitor layer LY3 is the highest in all the monitor layers LY1 to LY6.

FIG. 12 illustrates an example of the likelihood model LM, which is calculated in the above method.

Specifically, the likelihood model LM illustrated in FIG. 12 is comprised of a two-dimensional array of the reflector existence likelihoods, each of which is linked to (i) the corresponding value of distance relative to the radar device 20 in the horizontal axis for the two-dimensional array, and (ii) the corresponding value of vertical angle relative to the radar device 20. The likelihood model LM illustrated in FIG. 12 has a predetermined length of each distance section, which is set to, for example, 5 m, and also has a predetermined angle of each vertical angular section, which is set to, for example, 0.2°.

For example, a point in the likelihood model LM indicated by rectangle R11, which has a distance value of 10 m and a vertical angle value of 2.3°, has the reflector existence likelihood of 10. A point in the likelihood model LM indicated by rectangle R12, which has a distance value of 35 m and a vertical angle value of 0.3°, has the reflector existence likelihood of 33. A point in the likelihood model LM indicated by rectangle R13, which has a distance value of 70 m and a vertical angle value of 1.9°, has the reflector existence likelihood of 0.

The CPU 11 calculates a misalignment-quantity distribution in accordance with (i) the feature of each estimated target vehicle, that is, the reflector distance and the reflector monitor layer of each estimated target vehicle, stored in the feature list and (ii) the calculated likelihood model LM.

Assuming that a variable indicative of a misalignment quantity of the radar device 20 is x, a variable indicative of a value of the feature of each estimated target vehicle is z, and the number of features stored in the feature list is m, a misalignment-quantity probability distribution, which is referred to as P(z|x), can be represented by the following formula (1):

$$P(z|x)=\Sigma_m\{L(z_m|x)\} \qquad (1)$$

The following describes how to calculate the misalignment-quantity probability distribution P(z|x) in accordance with the formula (1).

Let us assume that a first feature, a second feature, and a third feature retrieved as the features of the respective first, second, and third estimated target vehicles, that is, m=3, are stored in the feature list.

As the first feature, the reflector distance of 30 m and the reflector monitor layer of the first monitor layer LY1 are retrieved. As the second feature, the reflector distance of 60 m and the reflector monitor layer of the second monitor layer LY2 are retrieved. As the third feature, the reflector distance of 80 m and the reflector monitor layer of the third monitor layer LY3 are retrieved.

Assuming that the misalignment quantity of the radar device 20 is 0°, FIG. 13 shows that (I) The first monitor layer LY1 includes the vertical angular range of 1.2° to 1.8°

(II) The second monitor layer LY2 includes the vertical angular range of 0.6° to 1.2°

(III) The third monitor layer LY3 includes the vertical angular range of 0.0° to 0.6°

(IV) The fourth monitor layer LY4 includes the vertical angular range of −0.6° to 0.0° inclusive (V) The fifth monitor layer LY5 includes the vertical angular range of −1.2° to −0.6°

(VI) The sixth monitor layer LY6 includes the vertical angular range of −1.8° to −1.2° inclusive The first feature includes the reflector distance of 30 m and the reflector monitor layer of the first monitor layer LY1. This results in the reflector existence likelihoods of 7, 8, and 10, which correspond to the first pair of reflector distance 30 m and the vertical angle 1.3°, the second pair of reflector distance 30 m and the vertical angle 1.5°, and the third pair of reflector distance 30 m and the vertical angle 1.7°, being extracted from the likelihood model LM. The total sum of the reflector existence likelihoods of 7, 8, and 10, which is 25, is calculated as a likelihood of the first feature assuming that the misalignment quantity is 0°. The likelihood of 25 of the first feature corresponds to the value $L(z_1|x=0°)$ of the function $L(z_m|x)$.

The second feature includes the reflector distance of 60 m and the reflector monitor layer of the second monitor layer LY2. This results in the reflector existence likelihoods of 5, 8, and 15, which correspond to the first pair of reflector distance 60 m and the vertical angle 0.7°, the second pair of reflector distance 60 m and the vertical angle 0.9°, and the third pair of reflector distance 60 m and the vertical angle 1.1°, being extracted from the likelihood model LM. The total sum of the reflector existence likelihoods of 5, 8, and 15, which is 28, is calculated as a likelihood of the second feature assuming that the misalignment quantity is 0°. The likelihood of 28 of the second feature corresponds to the value $L(z_2|x=0°)$ of the function $L(z_m|x)$.

The third feature includes the reflector distance of 80 m and the reflector monitor layer of the third monitor layer LY3. This results in the reflector existence likelihoods of 25, 35, and 58, which correspond to the first pair of reflector distance 80 m and the vertical angle 0.1°, the second pair of reflector distance 80 m and the vertical angle 0.3°, and the third pair of reflector distance 80 m and the vertical angle 0.5°, being extracted from the likelihood model LM. The total sum of the reflector existence likelihoods of 25, 35, and 58, which is 106, is calculated as a likelihood of the third feature assuming that the misalignment quantity is 0°. The likelihood of 106 of the third feature corresponds to the value $L(z_3|x=0°)$ of the function $L(z_m|x)$.

The total sum of the likelihood of 25 of the first feature, the likelihood of 28 of the second feature, and the likelihood of 106 of the third feature assuming that the misalignment quantity is 0°, which is 159, shows a probability $P(z|x=0°)$ of the misalignment-quantity probability distribution $P(z|x)$.

Assuming that the misalignment quantity of the radar device 20 is 0.6°, FIG. 14 shows that (I) The first monitor layer LY1 includes the vertical angular range of 1.8° to 2.4°

(II) The second monitor layer LY2 includes the vertical angular range of 1.2° to 1.8°

(III) The third monitor layer LY3 includes the vertical angular range of 0.6° to 1.2°

(IV) The fourth monitor layer LY4 includes the vertical angular range of 0.0° to 0.6° inclusive (V) The fifth monitor layer LY5 includes the vertical angular range of −0.6° to 0.0°

(VI) The sixth monitor layer LY6 includes the vertical angular range of −1.2° to −0.6° inclusive The first feature includes the reflector distance of 30 m and the reflector monitor layer of the first monitor layer LY1. This results in the reflector existence likelihoods of 5, 4, and 2, which correspond to the first pair of reflector distance 30 m and the vertical angle 1.9°, the second pair of reflector distance 30 m and the vertical angle 2.1°, and the third pair of reflector distance 30 m and the vertical angle 2.3°, being extracted from the likelihood model LM. The total sum of the reflector existence likelihoods of 5, 4, and 2, which is 11, is calculated as a likelihood of the first feature assuming that the misalignment quantity is 0.6°. The likelihood of 11 of the first feature corresponds to the value $L(z_1|x=0.6°)$ of the function $L(z_m|x)$.

The second feature includes the reflector distance of 60 m and the reflector monitor layer of the second monitor layer LY2. This results in the reflector existence likelihoods of 0, 0, and 0, which correspond to the first pair of reflector distance 60 m and the vertical angle 1.3°, the second pair of reflector distance 60 m and the vertical angle 1.5°, and the third pair of reflector distance 60 m and the vertical angle 1.7°, being extracted from the likelihood model LM. The total sum of the reflector existence likelihoods of 0, 0, and 0, which is 0, is calculated as a likelihood of the second feature assuming that the misalignment quantity is 0.6°. The likelihood of 0 of the second feature corresponds to the value $L(z_2|x=0.6°)$ of the function $L(z_m|x)$.

The third feature includes the reflector distance of 80 m and the reflector monitor layer of the third monitor layer LY3. This results in the reflector existence likelihoods of 8, 4, and 0, which correspond to the first pair of reflector distance 80 m and the vertical angle 0.7°, the second pair of reflector distance 80 m and the vertical angle 0.9°, and the third pair of reflector distance 80 m and the vertical angle 1.1°, being extracted from the likelihood model LM. The total sum of the reflector existence likelihoods of 8, 4, and 0, which is 12, is calculated as a likelihood of the third feature assuming that the misalignment quantity is 0.6°. The likelihood of 12 of the third feature corresponds to the value $L(z_3|x=0.6°)$ of the function $L(z_m|x)$.

The total sum of the likelihood of 11 of the first feature, the likelihood of 0 of the second feature, and the likelihood of 12 of the third feature assuming that the misalignment quantity is 0.6°, which is 12, shows a probability $P(z|x=0.6°)$ of the misalignment-quantity probability distribution $P(z|x)$.

That is, assuming that the misalignment quantity is (I°), a probability $P(z|x=\phi°)$ of the misalignment-quantity probability distribution $P(z|x)$ is calculated for each of the misalignment quantities (vertical angles) $\phi$, which is −1.7°, −1.5°, −1.3°, . . . , −0.1°, 0.1°, 0.3°, . . . , 3.3°, 3.5°, and 3.7°, of the likelihood model LM, resulting in the misalignment-quantity probability distribution $P(z|x)$ based on the likelihood model LM being calculated.

The misalignment-quantity probability distribution $P(z|x)$ is normalized to satisfy that the integral of the probability function $P(z|x)$ over the total range of the variable x ($\phi$) becomes 1.

When the operation in step S40 has completed set forth above, the CPU 11 performs a distribution updating task in step S50 of FIG. 4.

Specifically, let us assume that a misalignment-quantity probability distribution updated in step S50 of the main routine of the immediately previous frame will be referred to as $P_{t-1}$, a misalignment-quantity probability distribution calculated in step S40 of the main routine of the current frame will be referred to as $P_o$, and a misalignment-quantity probability distribution to be updated in step S50 of the main routine of the current frame will be referred to as $P_t$.

At that time, the CPU 11 updates the misalignment-quantity probability distribution $P_{t-1}$ to thereby calculate the misalignment-quantity probability distribution $P_t$ in accordance with the following formula (2):

$$P_t=\alpha\times P_{t-1}+(1-\alpha)\times P_o$$

where $\alpha$ represents a predetermined weight coefficient.

When the operation in step S50 has completed, the CPU 11 calculates a misalignment quantity of the radar device 20 in accordance with the misalignment-quantity probability distribution $P_t$ updated in step S50 of the main routine of the current frame in step S60. Thereafter, the main routine proceeds to step S70.

Specifically, the CPU 11 calculates an average and a standard deviation based on the misalignment-quantity probability distribution $P_t$ updated in step S50 assuming that, as illustrated in FIG. 15, the misalignment-quantity probability distribution $P_t$ is a normal probability distribution ND in step S60.

That is, the CPU 11 determines a vertical angle $w_{peak}$, i.e., an average, corresponding to the peak of the misalignment-quantity probability distribution $P_t$ as a misalignment quantity of the radar device 20. Additionally, the CPU 11 subtracts, from a first vertical angle $w_p$, a second vertical angle $w_m$ smaller than the first vertical angle $w_p$. Each of the first vertical angle $w_p$ and the second vertical angle $w_m$ corresponds to a value of the misalignment-quantity probability distribution $P_t$; the value of the misalignment-quantity probability distribution $P_t$ is substantially 60% of the peak of the misalignment-quantity probability distribution $P_t$. Then, the CPU 11 calculates the half of the difference to accordingly calculate the standard deviation, which will be referred to as $\sigma$, of the misalignment-quantity probability distribution $P_t$. That is, the CPU 11 calculates the standard deviation $\sigma$ of the misalignment-quantity probability distribution $P_t$ in accordance with the following formula (3):

$$\delta=(w_p-w_m)/2 \quad (3)$$

After the operation in step S60, the main routine proceeds to step S70. In step S70 of FIG. 4, the CPU 11 determines whether a predetermined correction start condition is satisfied.

The predetermined correction start condition according to the exemplary embodiment is that the number of features stored in the feature list is more than or equal to a predetermined first correction determination value and the standard deviation 6 calculated in step S60 is less than or equal to a predetermined second correction determination value.

In response to determination that the correction start condition is not satisfied (NO in step S70), the CPU 11 terminates the main routine. Otherwise, in response to determination that the correction start condition is satisfied (YES in step S70), the CPU 11 calculates a misalignment correction quantity for the radar device 20 in accordance with the misalignment quantity calculated in step S60. For example, the CPU 11 subtracts, from the misalignment quantity calculated in step S60 of the current frame, a latest misalignment quantity calculated in step S60 of the previous frames to accordingly calculate the misalignment correction quantity.

Following the operation in step S80, the CPU 11 shifts, by the misalignment quantity, the selected focus visual field, such as the focus visual field FV1, in the vertical direction, i.e., a Z direction, making it possible to correct the misalignment of the radar device 20 in step S90. Note that movement of the focus visual field FV1 in the Z direction can be carried out in unit of the vertical angular range of one monitor layer, so that the misalignment correction quantity is calculated by unit of the vertical angular range of one monitor layer.

When the operation in step S90 has completed, the CPU 11 terminates the main routine of the current frame.

The ECU 10 set forth above is configured to retrieve, based on a measurement result of the radar device 20 installed in the own vehicle VH, (i) a distance of at least one reflector of each preceding vehicle, which is traveling in front of the own vehicle VH, relative to the radar device 20, and (ii) a monitor layer of the at least one reflector of each preceding vehicle.

The ECU 10 is configured to calculate a misalignment quantity of the radar device 20 using maximum likelihood estimation, which has been described above, in accordance with (i) the likelihood model LM that includes a correlation representing a reflector existence likelihood at each specified value of distance relative to the radar device 20 in each monitor layer, i.e., in each vertical angular range of the corresponding monitor layer, and (ii) the retrieved distance and monitor layer of the at least one reflector of each preceding vehicle relative to the radar device 20.

The ECU 10 configured set forth above uses the likelihood model LM to calculate the misalignment quantity of the radar device 20 in view of the variations in mount height of preceding-vehicle's reflectors, making it possible to improve the calculation accuracy of the misalignment quantity of the radar device 20.

The ECU 10 has a first functional configuration that determines, in step S130, whether the height of the at least one reflector of each preceding vehicle exceeds a predetermined exclusion height threshold. In response to determination that the height of the at least one reflector of at least one preceding vehicle exceeds the predetermined exclusion height threshold, the first functional configuration of the ECU 10 excludes, from calculation of the misalignment quantity of the radar device 20, the retrieved distance and monitor layer of the at least one reflector of the at least one preceding vehicle relative to the radar device 20.

When the preceding vehicles include a first preceding vehicle PV1 and a second preceding vehicle PV2 in front of the first preceding vehicle PV1, the ECU 10 has a second functional configuration that determines, in step S140, whether there is an occlusion situation where a part of the second preceding vehicle PV2 is occluded by the first preceding vehicle PV1. In response to determination that there is an occlusion situation where a part of the second preceding vehicle PV2 is occluded by the first preceding vehicle PV1, the second functional configuration excludes, from calculation of the misalignment quantity of the radar device 20, the retrieved distance and monitor layer of the at least one reflector of the second preceding vehicle PV2 relative to the radar device 20.

The ECU 10 has a third functional configuration that determines, in step S150, whether an image of each preceding vehicle is a false image. In response to determination that the image of at least one preceding vehicle is a false image, the third functional configuration of the ECU 10 excludes, from calculation of the misalignment quantity of the radar device 20, the retrieved distance and monitor layer of the at least one reflector of the at least one preceding vehicle relative to the radar device 20.

These first to third functional configurations of the ECU 10 exclude one or more reflectors that are unsuitable for calculation of the misalignment quantity of the radar device 20 to accordingly calculate the misalignment quantity of the radar device 20, making it possible to further improve the calculation accuracy of the misalignment quantity of the radar device 20.

The reflector existence likelihood at each specified value of distance relative to the radar device 20 in each monitor layer, i.e., each vertical angular range, of the corresponding monitor layer is defined in accordance with (i) a distribution of reflector-mount heights of respective sold vehicles and (ii) a mount-height of the radar device 20 of the own vehicle VH. This makes it possible to still further improve the calculation accuracy of the misalignment quantity of the radar device 20.

The ECU 10 of the exemplary embodiment corresponds to a misalignment calculation apparatus. The ECU 10 of the exemplary embodiment serves as a reflector information retrieving unit to perform the operations in steps S110 and S120. The ECU 10 of the exemplary embodiment serves as a misalignment quantity calculator to perform the operations in steps S40 to S60. The distance and monitor layer of at least one reflector of each preceding vehicle of the exemplary embodiment correspond to positional information on the at least one reflector.

The ECU 10 of the exemplary embodiment serves as a reflector-height exclusion unit configured to perform the operation in step S130. The ECU 10 of the exemplary embodiment serves as an occlusion exclusion unit configured to perform the operation in step S140. The ECU of the exemplary embodiment serves as a false-image exclusion unit to perform the operation in step S150.

The present invention is not limited to the above exemplary embodiment, and can be freely modified.

The above ECU 10 and its methods described in the present disclosure can be implemented by a dedicated computer including a memory and a processor programmed to perform one or more functions embodied by one or more computer programs.

The above ECU 10 and its methods described in the present disclosure can also be implemented by a dedicated computer including a processor comprised of one or more dedicated hardware logic circuits.

The above ECU 10 and its methods described in the present disclosure can further be implemented by at least one dedicated computer comprised of a memory, a processor programmed to perform one or more functions embodied by one or more computer programs, and one or more hardware logic circuits.

The computer programs described in the present disclosure can be stored in a computer-readable non-transitory storage medium as instructions executable by a computer and/or a processor.

Software-based methods can be preferably used to implement functions of each unit include in the ECU 10, but all the functions can be implemented by plural hardware units.

The functions of one element in the exemplary embodiment can be implemented by plural elements, and the functions that plural elements have can be implemented by one element. The functions of plural elements in the exemplary embodiment can be implemented by one element, and one function implemented by one element. At least part of the structure of the exemplary embodiment can be replaced with a known structure having the same function as the at least part of the structure of the corresponding embodiment. A part of the structure of the exemplary embodiment can be eliminated, and at least part of the structure of the exemplary embodiment can be added to or replaced with the structure of the exemplary embodiment.

The present disclosure can be implemented by, in addition to the ECU 10, various measures that include (i) systems, each of which includes the ECU 10, (ii) programs, each of which causes a computer to serve as the ECU 10, (iii) non-transitory storage media, each of which stores at least one of the programs, or (iv) misalignment calculation methods.

The invention claimed is:

1. A misalignment calculation apparatus comprising:

a reflector information retrieving unit configured to retrieve, based on a measurement result of a radar device installed in an own vehicle, a positional information items of reflectors of preceding vehicles that are traveling in front of the own vehicle, each positional information item representing a position of a corresponding reflector; and a misalignment-quantity calculator configured to calculate a misalignment quantity of the radar device using maximum likelihood estimation in accordance with:

a likelihood model that includes a predetermined correlation representing a reflector existence likelihood at specified positions relative to the radar device; and the retrieved positional information items of the reflectors of the preceding vehicles relative to the radar device, wherein the misalignment-quantity calculator is configured to correct a misalignment of the radar device based on the calculated misalignment quantity.

2. The misalignment calculation apparatus according to claim 1, wherein:

each specified position relative to the radar device of the likelihood model includes a corresponding value of distance relative to the radar device in a corresponding vertical angular range relative to an optical axis of the radar device, the optical axis of the radar device representing a radio-wave transmission/reception direction of the radar device.

3. The misalignment calculation apparatus according to claim 1, further comprising:

a reflector-height excluding unit configured to:

determine whether a height of the reflector of each of the preceding vehicles exceeds a predetermined exclusion height threshold; and exclude, in response to determination that the height of the reflector of at least one preceding vehicle in the preceding vehicles exceeds the predetermined exclusion height threshold, the retrieved positional information item of the reflector of the at least one preceding vehicle from calculation of the misalignment quantity of the radar device.

4. The misalignment calculation apparatus according to claim 1, wherein the preceding vehicles include a first preceding vehicle and a second preceding vehicle traveling in front of the first preceding vehicle, the misalignment calculation apparatus further comprising:

an occlusion excluding unit configured to:

determine whether there is an occlusion situation where a part of the second preceding vehicle is occluded by the first preceding vehicle; and exclude, in response to determination that there is an occlusion situation where a part of the second preceding vehicle is occluded by the first preceding vehicle, the retrieved positional information item of the reflector of the second preceding vehicle from calculation of the misalignment quantity of the radar device.

5. The misalignment calculation apparatus according to claim 1, further comprising:

a false-image excluding unit configured to:

determine whether an image of each of the preceding vehicles is a false image; and exclude, in response to determination that the image of at least one preceding vehicle is a false image, the retrieved positional information item of the reflector of the at least one preceding vehicle from calculation of the misalignment quantity of the radar device.

6. The misalignment calculation apparatus according to claim 1, wherein:

the reflector existence likelihood at each specified position relative to the radar device is defined in accordance with a distribution of reflector-mount heights of respective sold vehicles.

7. The misalignment calculation apparatus according to claim 1, wherein:

the reflector existence likelihood at each specified position relative to the radar device is defined in accordance with a mount-height of the radar device of the own vehicle.

8. A processor-readable non-transitory storage medium comprising:

a set of program instructions that causes at least one processor to:

retrieve, based on a measurement result of a radar device installed in an own vehicle, a positional information items of reflectors of each of preceding vehicles that are traveling in front of the own vehicle, each positional information item representing a position of a corresponding reflector;

calculate a misalignment quantity of the radar device using maximum likelihood estimation in accordance with:

a likelihood model that includes a predetermined correlation representing a reflector existence likelihood at specified positions relative to the radar device; and the retrieved positional information items of the reflectors of the preceding vehicles relative to the radar device; and correct a misalignment of the radar device based on the calculated misalignment quantity.

9. A method, executable by a processor, comprising:

retrieving, based on a measurement result of a radar device installed in an own vehicle, a positional information items of reflectors of each of preceding vehicles that are traveling in front of the own vehicle, each positional information item representing a position of a corresponding reflector; and calculating a misalignment quantity of the radar device using maximum likelihood estimation in accordance with:

a likelihood model that includes a predetermined correlation representing a reflector existence likelihood at specified positions relative to the radar device; and the retrieved positional information items of the reflectors of the preceding vehicles relative to the radar device; and correcting a misalignment of the radar device based on the calculated misalignment quantity.

* * * * *